United States Patent
Sugi

(10) Patent No.: US 8,300,237 B2
(45) Date of Patent: Oct. 30, 2012

(54) INFORMATION PROCESSING APPARATUS, RULE FILE OUTPUTTING APPARATUS, PROGRAM, AND METHOD OF DETERMINING EXCLUSIVE RELATIONSHIP BETWEEN PARAMETERS

(75) Inventor: Yoshihiro Sugi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1155 days.

(21) Appl. No.: 12/216,189

(22) Filed: Jul. 1, 2008

(65) Prior Publication Data

US 2009/0009807 A1    Jan. 8, 2009

(30) Foreign Application Priority Data

Jul. 6, 2007   (JP) ................................. 2007-178181

(51) Int. Cl.
*G06F 15/00* (2006.01)
*G06K 1/00* (2006.01)

(52) U.S. Cl. ........................................ 358/1.13; 358/1.9

(58) Field of Classification Search ................... None
See application file for complete search history.

(56) References Cited

U.S. PATENT DOCUMENTS

| 2006/0132857 A1* | 6/2006 | Akashi | ............................ 358/448 |
| 2007/0013931 A1* | 1/2007 | Ito | .................................. 358/1.13 |

FOREIGN PATENT DOCUMENTS

| JP | 09-179450 | 7/1997 |
| JP | 3175479 | 4/2001 |
| JP | 2002-084383 | 3/2002 |
| JP | 2006-115482 | 4/2006 |
| JP | 2007-158929 | 6/2007 |

OTHER PUBLICATIONS

Abstract of JP 07-321967 published Dec. 8, 1995.

* cited by examiner

*Primary Examiner* — Thierry Pham
(74) *Attorney, Agent, or Firm* — Harness, Dickey & Pierce, P.L.C.

(57) ABSTRACT

The propriety of combining received parameters is determined based on a property as a characteristic resulting from the content of processing executed in accordance with each of the parameters. Thus, if the relationship between the parameters incapable of being simultaneously used is defined in terms of the "property," it is not necessary to define an exclusive relationship between the parameters. As a result, it is possible to easily manage the relationship between parameters added and deleted by a customization operation and existing parameters.

16 Claims, 31 Drawing Sheets

FIG.6

| | SECONDARY-SELECTED FUNCTION | | | | | |
|---|---|---|---|---|---|---|
| INITIALLY-SELECTED FUNCTION | | SETTING VALUE A | SETTING VALUE B | SETTING VALUE C | SETTING VALUE D | ... |
| | SETTING VALUE A | | ● | | × | ... |
| | SETTING VALUE B | ● | | × | | ... |
| | SETTING VALUE C | | × | | ● | ... |
| | SETTING VALUE D | × | | ● | | ... |
| | ⋮ | ⋮ | ⋮ | ⋮ | ⋮ | |

● ··· SECONDARY-SELECTED FUNCTION IS PRIORITIZED
× ··· INITIALLY-SELECTED FUNCTION IS PRIORITIZED

FIG.7

| PROPERTY EXTRACTED BY READING FUNCTION | PARAMETER OF EXTRACTION SOURCE |
|---|---|
| PLURAL PAGES ARE READ | DOUBLE-PAGE DOCUMENT |
| PROPERTIES EXTRACTED BY IMAGE EDITING FUNCTION | |
| DETERMINATION OF IMAGE AREA IS REQUIRED | INTENSIVE |
| | MINI-BOOK |
| | WEEKLY MAGAZINE |
| | DOUBLE COPY |
| | CENTERING |
| | PRINTING |
| IMPOSITION IS NOT PERFORMED IN ORDER OF INPUTTING IMAGES | MINI-BOOK |
| | WEEKLY MAGAZINE |
| REPEATED IMAGE | DOUBLE COPY |
| | REPEAT COPY |
| REPEATED IMAGE (UNDETERMINED NUMBER OF REPETITIONS) | REPEAT COPY |
| SYNTHETIC IMAGE (IN CASE WHERE ONE IMAGE IS UNINTENTIONALLY OVERWRITTEN ON THE OTHER IMAGE) | SECURITY CONTROL NUMBERING |
| NEEDS ON SINGLE PAGE BASIS | REPEAT COPY |
| IMAGE IS PARTIALLY EXTRACTED | REPEAT (RANGE SPECIFICATION) |
| DOUBLE-SIDED IMAGE | DOUBLE-SIDED PRINTING |
| | MINI-BOOK |
| | WEEKLY MAGAZINE |
| PROPERTIES EXTRACTED BY PRINTING FUNCTION | |
| OHP TRANSFER PAPER | INTERLEAF |
| CHAPTER DELIMITING | CHAPTER DELIMITING |
| INDEFINITE TRANSFER PAPER SIZE | MANUAL PAPER FEEDING |
| AVAILABLE ONLY IN PLURAL PAGES | CHAPTER DELIMITING |
| INDEFINITE SUB-SCANNING LENGTH | MANUAL PAPER FEEDING |

FIG.8

| | INDEFINITE SUB-SCANNING LENGTH | INDEFINITE TRANSFER PAPER SIZE | DOUBLE-SIDED IMAGE | DETERMINATION OF IMAGE AREA IS REQUIRED | REPEATED IMAGE | REPEATED IMAGE (UNDETERMINED NUMBER OF REPETITIONS) | IMAGE IS PARTIALLY EXTRACTED | PLURAL PAGES ARE READ | OHP TRANSFER PAPER | IMPOSITION IS NOT PERFORMED IN ORDER OF INPUTTING IMAGES | CHAPTER DELIMITING | NEEDS ON SINGLE PAGE BASIS | AVAILABLE ONLY IN PLURAL PAGES | SYNTHETIC IMAGE |
|---|---|---|---|---|---|---|---|---|---|---|---|---|---|---|
| INDEFINITE SUB-SCANNING LENGTH | | | × | | | | | | | | | | | |
| INDEFINITE TRANSFER PAPER SIZE | | | | × | | × | | | | | | | | |
| DOUBLE-SIDED IMAGE | | | | | | | | | × | | | | | |
| DETERMINATION OF IMAGE AREA IS REQUIRED | | | | | | | | | | | | | | |
| REPEATED IMAGE | | | | | | | | | × | | | | | |
| REPEATED IMAGE (UNDETERMINED NUMBER OF REPETITIONS) | | | | | | | | | | | | | | |
| IMAGE IS PARTIALLY EXTRACTED | | | | | | | | × | | | | | | |
| PLURAL PAGES ARE READ | | | | | | | | | | | | | | |
| OHP TRANSFER PAPER | | | | | | | | | | | × | | | |
| IMPOSITION IS NOT PERFORMED IN ORDER OF INPUTTING IMAGES | | | | | | | | | | | | | | |
| CHAPTER DELIMITING | | | | | | | | | | | | | × | |
| NEEDS ON SINGLE PAGE BASIS | | | | | | | | | | | | | | × |
| AVAILABLE ONLY IN PLURAL PAGES | | | | | | | | | | | | | | |
| SYNTHETIC IMAGE | | | | | | | | | | | | | | |

ASSOCIATED PROPERTIES
☐ INDEFINITE TRANSFER PAPER SIZE BEFORE EXECUTION
☐ OHP TRANSFER PAPER
☐ CHAPTER DELIMITING
☑ AVAILABLE ONLY IN PLURAL PAGES
☑ DETERMINATION OF IMAGE AREA IS REQUIRED
☐ REPEATED IMAGE (UNDETERMINED NUMBER OF REPETITIONS)
☐ IMPOSITION IS NOT PERFORMED IN ORDER OF INPUTTING IMAGES
☐ IMAGE IS PARTIALLY EXTRACTED
☐ PLURAL PAGES ARE READ

FIG.27

```xml
<?xml version="1.0" encoding="UTF-8" standalone="yes" ?>
-<ROOT>
  <PREFERENCE NAME="jp.co.ricoh.esdk.applicationLogic.filter.process.ProcessFilterPreference"/>
  -<PARAMETER NEME="1">
    <PARAMETER_VALUE ID="1"/>
    -<PARAMETER_VALUE ID="2">
      <ESSENCE ID="1"/>
    </PARAMETER_VALUE>
    -<PARAMETER_VALUE ID="3">
      <ESSENCE ID="2"/>
      <ESSENCE ID="3"/>
    </PARAMETER_VALUE>
  </PARAMETER>
</ROOT>
```

F

INFORMATION PROCESSING APPARATUS, RULE FILE OUTPUTTING APPARATUS, PROGRAM, AND METHOD OF DETERMINING EXCLUSIVE RELATIONSHIP BETWEEN PARAMETERS

BACKGROUND OF THE INVENTION

1. Field of the Invention

The present invention relates to an information processing apparatus, a rule file outputting apparatus, a program, and a method of determining an exclusive relationship between parameters.

2. Description of the Related Art

Conventionally, multifunction machines referred to as MFPs (Multifunction Peripherals) having plural functions such as a printer function, a copier function, and a scanner function in a housing are known. In such a MFP, plural application programs such as a printer application, a copier application, and a scanner application are installed on universal versatile operating systems such as UNIX (Registered Trademark). The MFP implements the plural functions by switching the execution processing of these application programs.

However, because the printer application, the copier application, and the scanner application individually perform engine control, memory control, system control, etc., wasteful duplicated processing is caused.

According to Patent Document 1, the processing such as the engine control, the memory control, and the system control individually handled by plural application programs installed in the MFP, are taken out from the application programs in a bundled manner as a common processing part (platform), thereby attaining an improvement in development efficiency of the application programs.

Furthermore, according to Patent Document 2, a combination check table is used to determine the propriety of combining various functions such as a sort selecting function and a tray selecting function shared by plural application programs installed in the MFP.

However, the invention disclosed in Patent Document 1 is intended not to standardize entire internal processing of the application programs, but to standardize processing units that control hardware devices. Therefore, the application programs in the MFP have room for improving the development efficiency.

For example, setting management processing is processing common to the respective application programs in the copier, in which a function setting request from users is received via control software programs of an operations panel, the propriety of combining selected functions is determined, and the determination results are reported to the users in such a way that an input to the operations panel is restricted. However, because the setting management processing is not processing for directly controlling the hardware devices, it is individually implemented by the respective application programs. Therefore, it is possible to standardize the setting management processing.

Furthermore, the invention disclosed in Patent Document 2 determines the propriety of combining the various functions by using the combination check table. However, it becomes difficult to easily maintain the combination check table as the size of the table increases due to the multiple functions of the copier. Accordingly, there are possibilities of increasing the number of steps for adding and upgrading functions and causing improper control for combining the functions.

From the viewpoint of this, it is significant how the setting management processing for the application programs installed in the MFP is efficiently implemented. Note that such a problem is caused not only in the MFP, but also, for example, in a setting management apparatus that controls the combination between settings of plural functions.

Therefore, in Patent Document 3, the present Applicant has proposed a setting management apparatus, a setting management program, and an image forming apparatus capable of efficiently implementing the setting management processing.

Patent Document 1: JP-A-2002-084383
Patent Document 2: JP-B2-3175479
Patent Document 3: JP-A-2006-115482

SUMMARY OF THE INVENTION

According to the technique disclosed in Patent Document 3, emphasis is mainly laid on efficient management of the relationship between setting items. However, it does not refer to the relationship between setting items added and deleted by a customization operation and existing setting items.

The present invention has been made in view of the above problems and may enable managing the relationship between parameters added and deleted by a customization operation and existing parameters with ease.

According to one aspect of the present invention, there is provided an information processing apparatus that receives a parameter for setting a content of processing and executes the processing in accordance with the received parameter. The information processing apparatus comprises a combination propriety determining unit that determines, when receiving plural of the parameters, propriety of combining the received parameters based on a property as a characteristic resulting from the content of processing executed in accordance with each of the parameters.

According to another aspect of the present invention, there is provided a method of determining an exclusive relationship between parameters in an information processing apparatus that receives a parameter for setting a content of processing and executes the processing in accordance with the received parameter. The method comprises a combination propriety determining step of determining, when receiving plural of the parameters, propriety of combining the received parameters based on a property as a characteristic resulting from the content of processing executed in accordance with each of the parameters.

Other objects, features and advantages of the present invention will become more apparent from the following detailed description when read in conjunction with the accompanying drawings.

BRIEF DESCRIPTION OF THE DRAWINGS

FIG. 6 shows a setting value combination table;

FIG. 7 shows an example of a relationship table of properties and parameters for defining an exclusive relationship;

FIG. 8 shows the exclusive relationship table between the properties;

FIG. 26 shows an UI (User Interface) list where properties associated with the parameters and the setting values are selectable;

FIG. 27 shows a rule file for showing the exclusive relationship;

DETAILED DESCRIPTION OF THE PREFERRED EMBODIMENTS (First Embodiment)

Referring to FIGS. 1 through 29, a description is made of a first embodiment of the present invention. The present embodiment refers to an example in which a digital multi-function peripheral (hereinafter referred to as a digital MFP) as an information processing apparatus is applied. However, the present invention is not limited to this, but it can be applied to various apparatuses that perform setting management.

Figure 1:
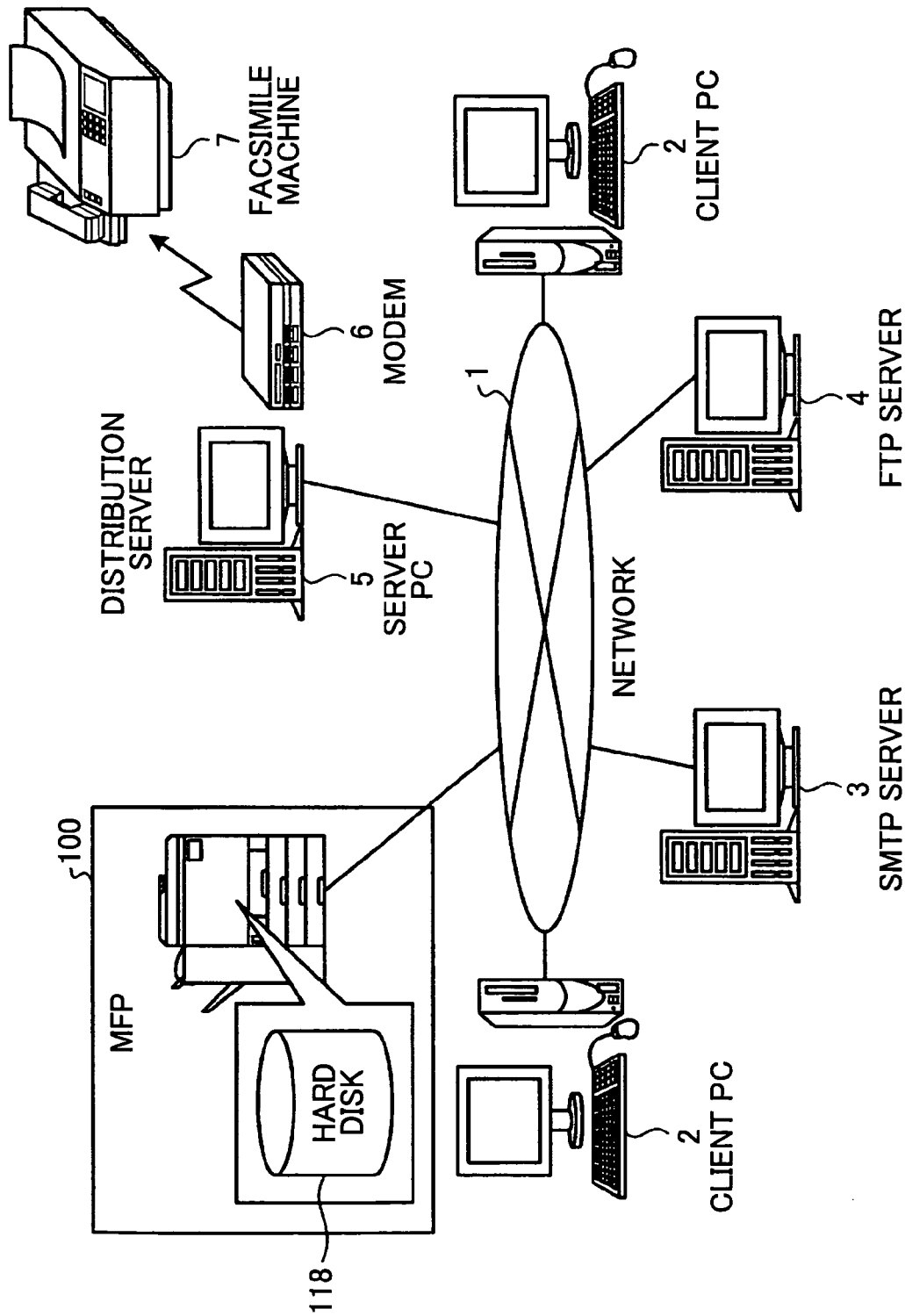
FIG. 1 is a schematic view showing a network configuration around a digital MFP (Multi-Function Peripheral) according to a first embodiment of the present invention.

FIG. 1 is a schematic view showing a network configuration around a digital MFP 100 according to the first embodiment of the present invention. As shown in FIG. 1, because networking has been recently developed, it is general practice that apparatuses such as personal computers (PCs) provided in an office or the like are connected to a network 1 such as a LAN (Local Area Network) so as to be mutually in communication with each other. For example, as shown in FIG. 1, a network 1 is connected to a client PC 2, a SMTP (Simple Mail Transfer Protocol) server 3, a FTP (File Transfer Protocol) server 4, a distribution server PC 5, and the like, thereby making it possible to transmit and receive e-mails and transfer files. Furthermore, the distribution server PC 5 connected to a modem 6 can communicate with a facsimile machine 7 provided outside the office.

In accordance with such a developed networking, the digital MFP 100 is also connected to the network 1 to communicate with the apparatuses such as PCs. Incorporating a storage device such as a hard disk 118, the digital MFP 100 can be developed into a so-called network MFP to meet various user requests.

For example, in addition to a general purpose copier function, the digital MFP 100 includes a printer function that prints document data or the like in response to a printing request from the client PC 2, a facsimile function that transmits document data or the like to the facsimile machine 7 provided in other offices via the modem 6 connected to the distribution server PC 5 in response to a facsimile request from the client PC 2, an accumulation function that accumulates received facsimile documents and copier documents in the incorporated hard disk 118, and the like.

In order to implement many functions required in accordance with the development of the network MFP and the networking, software programs installed in the digital MFP 100 are large in size and complicated. In conjunction with this, the number of steps for developing and maintaining the software programs is greatly increased.

Figure 2:
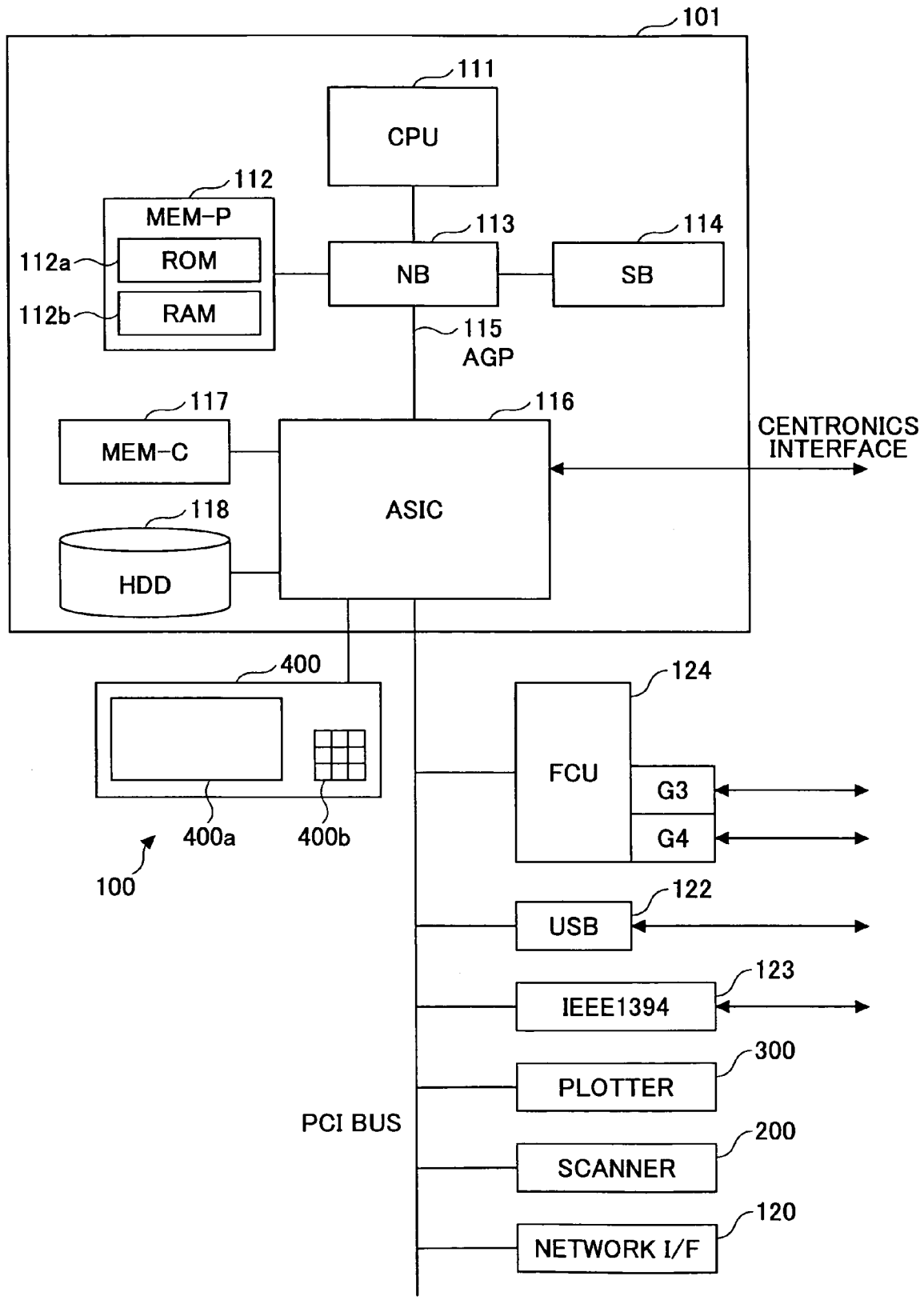
FIG. 2 is a block diagram for showing the hardware configuration of the digital MFP.

FIG. 2 is a block diagram for showing the hardware configuration of the digital MFP 100. As shown in FIG. 2, the digital MFP 100 includes a controller 101, a plotter 300, and a scanner 200, all of which are connected to one another via a PCI (Peripheral Component Interconnect) bus. The controller 101 performs controlling of, rendering for, and communication with the entire digital MFP 100 and controls an input from an operations unit 400. Note that the plotter 300 or the scanner 200 includes an image processing part for performing error diffusion, gamma conversion, and the like. The operations unit 400 includes an operations displaying unit 400a that displays on a LCD (Liquid Crystal Display) document image information or the like of the document scanned by the scanner 200 and receives an input from users via a touch panel and a keyboard unit 400b that receives a key input from the users.

The controller 101 includes a CPU (Central Processing Unit) 111 as a main part of a computer, a system memory (MEM-P) 112, a NB (North Bridge) 113, a SB (South Bridge) 114, an ASIC (Application Specific Integrated Circuit) 116, a local memory (MEM-C) 117, and a HDD (Hard Disk Drive) 118. The NB 113 and the ASIC 116 are connected to each other by an AGP (Accelerated Graphics Port) bus 115. Furthermore, the MEM-P112 includes a ROM (Read Only Memory) 112a and a RAM (Random Access Memory) 112b.

The CPU 111 performs the control of the entire digital MFP 100 and includes a chip set consisting of the NB 113, the MEM-P 112, and the SB 114. The CPU 111 is connected to other apparatuses via the chip set.

The NB 113 is a bridge that connects the CPU 111, the MEM-P 112, the SB 114, and the AGP bus 115 to one another, and it includes a memory controller that controls the reading and writing from and to the MEM-P 112, a PCI master, and an AGP target.

The MEM-P 112 is a system memory that stores programs and data, aids in developing the programs, assists in rendering by a printer, and the like. The MEM-P112 consists of a ROM 112a and a RAM 112b. The ROM 112a is a read-only memory that stores programs and data for controlling the operations of the CPU 111, and the RAM 112b is a writable and readable memory that aids in developing the programs and rendering by the printer.

The SB 114 is a bridge that connects the NB 113, a PCI device, and peripheral devices to one another. The SB 114 is connected to the NB 113 via the PCI bus, and the PCI bus is connected to a network interface (I/F) unit 120 or the like.

The ASIC 116 is an image-processing-specific IC (Integrated Circuit) having a hardware element for image processing and serves as a bridge connected to the AGP bus 115, the PCI bus, the HDD 118, and the MEM-C 117. The ASIC 116 consists of a PCI target, an AGP master, an ARB (arbiter) that lies at the heart of the ASIC 116, a memory controller that controls the MEM-C 117, plural DMACs (Direct Memory Access Controllers) that, for example, rotate image data in accordance with hardware logic, and a PCI unit that transfers data between the plotter 300 and the scanner 200 via the PCI bus. The ASIC 116 is connected to a FCU (Facsimile Control Unit) 124, a USB (Universal Serial Bus) 122, and an IEEE 1394 (Institute of Electrical and Electronics Engineers 1394) interface 123.

The MEM-C 117 is a local memory used as a copying image buffer and a code buffer, and the HDD 118 is a storage that accumulates the programs for controlling the operations of the CPU 111, font data, and formats.

The AGP bus 115 is a bus interface for a graphics accelerator card developed for accelerating graphics processing. The AGP bus 115 accelerates the graphics accelerator card by directly accessing the MEM-P 112 at high throughput.

Figure 3:
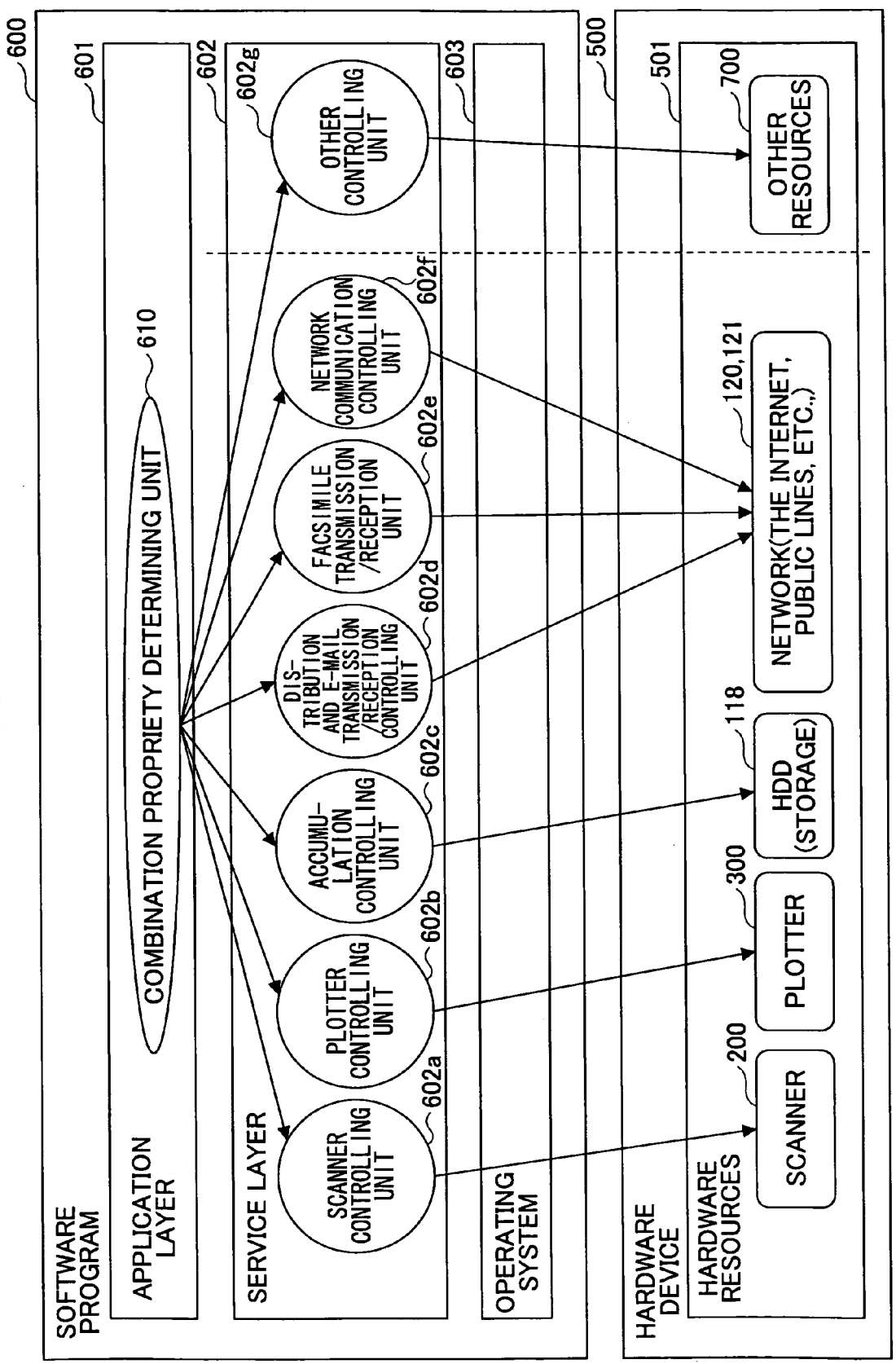
FIG. 3 is a conceptual diagram for showing the configuration of a hardware device and a software program of the digital MFP.

FIG. 3 is a conceptual diagram for showing the configuration of a hardware device 500 and a software program 600 of the digital MFP 100. As shown in FIG. 3, the hardware device 500 includes hardware resources 501. The hardware resources 501 include the scanner 200, the plotter 300, the HDD 118, networks 120 and 121, and other resources 700. Note that other resources 700 refer, for example, to an input/output device such as an operations panel.

Furthermore, the software program 600 installed in the digital MFP 100 is stratified in such a way that an application layer 601, a service layer 602, and an operating system 603 are successively layered from the above in this order. The application layer 601 includes an application having a combination propriety determining unit (combination propriety determining means) as a part of the present embodiment described below. The service layer 602 includes a scanner controlling unit 602a, a plotter controlling unit 602b, an accumulation controlling unit 602c, a distribution and e-mail transmission/reception controlling unit 602d, a facsimile transmission/reception unit 602e, a network communication controlling unit 602f, and other controlling unit 602g, which are relevant to the drivers that control the hardware resources.

Figure 4:
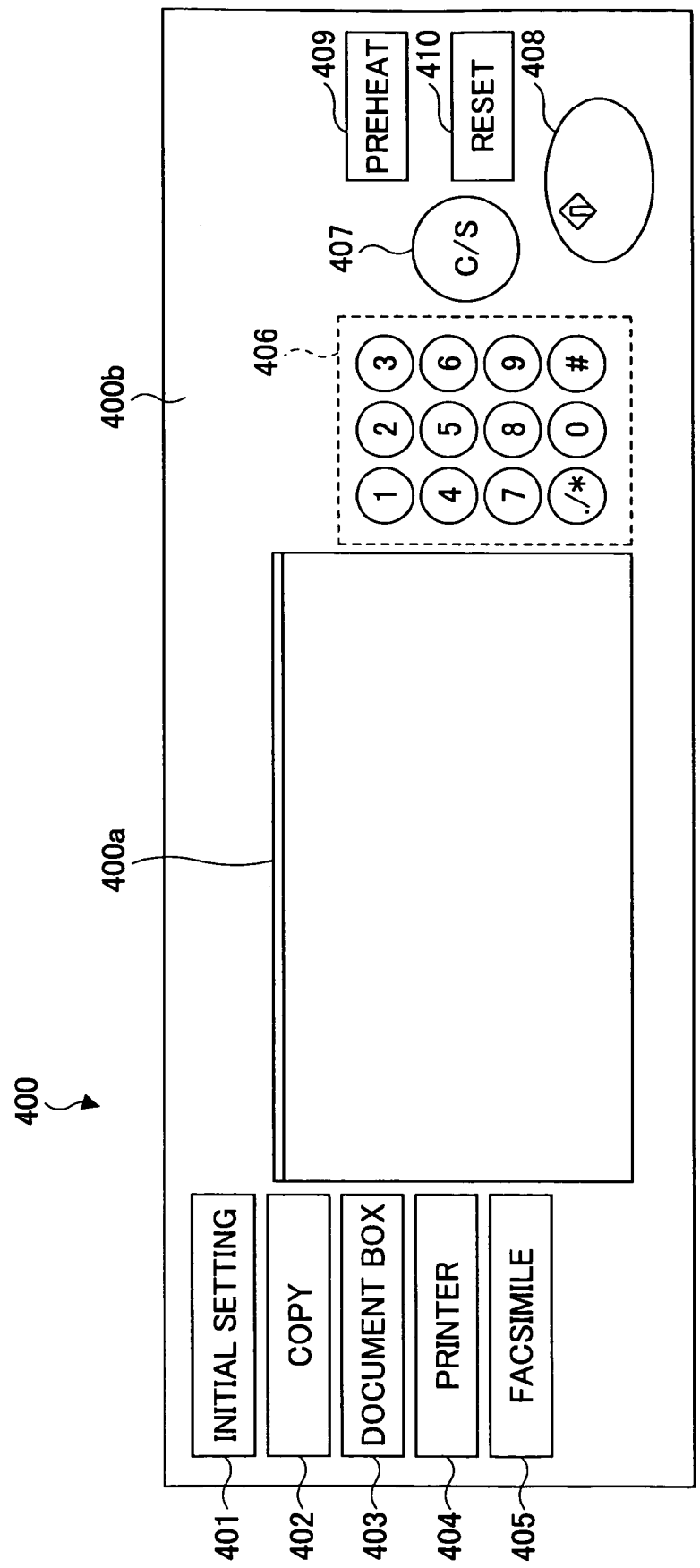
FIG. 4 is a front view showing an example of an operations unit of the digital MFP.

FIG. 4 is a front view showing an example of the operations unit 400 of the digital MFP 100. As shown in FIG. 4, a keyboard part 400b of the operations unit 400 includes an initial setting key 401, a copy key 402, a document box key 403, a printer key 404, a facsimile key 405, a numeric keypad 406, a clear/stop key 407, a start key 408, a preheat key 409, and a reset key 410.

When the initial setting key 401 is operated, an initial-setting menu is displayed on the operations displaying unit 400a. In accordance with the menu, the size of paper to be accommodated or the like can be set.

By operating application switching keys (402 through 405) of the operations unit 400, it is possible for the users to sequentially switch and select a document box function, a copying function, a printer function, and a facsimile function. When the document box function is selected, a document box mode is established to accumulate a copying result in the HDD 118. Similarly, when the printer function and the facsimile function are selected, a printer mode and a facsimile mode are established, respectively.

Figure 5:
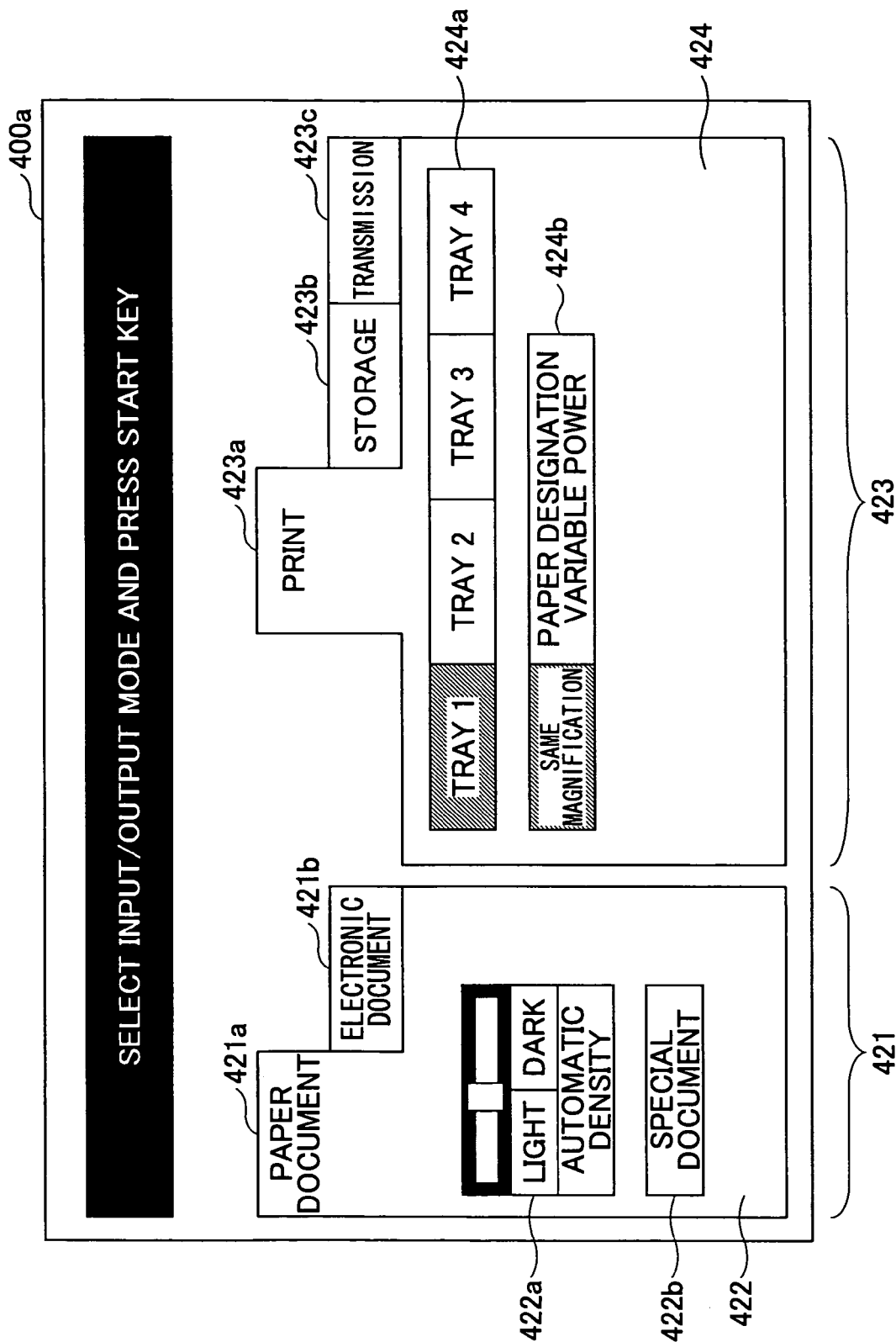
FIG. 5 shows an example of the menu displayed on an operations displaying unit.

FIG. 5 shows an example of the menu displayed on an operations displaying unit 400a. This menu is displayed on the operations displaying unit 400a when the copy key 402 shown in FIG. 4 is pressed. As shown in FIG. 5, a paper document tab 421a and an electronic document tab 421b are displayed on the operations displaying unit 400a as an input mode 421. When the paper document tab 421a is selected, a density setting part 422a and a special document setting part 422b are displayed in an input mode area 422. Furthermore, a print tab 423a, a storage tab 423b, and a transmission tab 423c are displayed on the operations displaying unit 400a as an output mode 423. When the printing tab 423a is selected, a tray selecting part 424a and a magnification setting part 424b are displayed in an outputting mode area 424.

For example, any one of "trays 1 through 4" can be selected in the tray selecting part 424a, and any one of "same magnification" and "paper designation variable power" can be selected in the magnification setting part 424b. Here, the tray selecting part 424a or the like having alternative choices is called a "function/setting item," and each of the alternative choices "trays 1 through 4" is called a "setting value." Note that objects for setting the content of processing such as the "function/setting item" and the "setting value" are referred to as "parameters."

Next, a description is specifically made of a combination propriety determining unit 610 as a part of the present embodiment.

Conventionally, a setting value combination table t as shown in FIG. 6 has been generally used to manage a combinational relationship between "parameters." In the setting value combination table t, all "setting values" are listed to form a two-dimensional table so as to manage the combination of the setting values incapable of being simultaneously selected. For example, where the combination of a setting value A and a setting value B is not possible because they are incapable of being simultaneously selected and a secondary-selected setting value takes priority over an initially-selected setting value, such a combinational relationship is managed in cells represented by "●." Furthermore, where the combination of the setting value A and a setting value D is not possible because they are incapable of being simultaneously selected and the initially-selected setting value takes priority over the secondary-selected setting value, such a combinational relationship is managed in cells represented by "X." Note that cells having no symbols such as "●" and "X" show a combinational relationship between the setting values capable of being simultaneously selected.

However, as a digital MFP includes many setting values due to its multifunction nature, the size of the setting value combinational table t greatly increases. Therefore, when the design of the digital MFP is changed or when new functions are added to the digital MFP, correction errors may be easily caused in the table, which in turn increases the likelihood of improperly performing combinational control of respective functions.

In view of this, according to the combination propriety determining unit 610 of the digital MFP 100 of the present embodiment, the combination of functions having an exclusive (incompatible) relationship is expressed in terms of the concept of "property." Here, the "property" refers to characteristics (including constraints as well) depending on the contents of processing executed in accordance with respective parameters. More specifically, the "property" is obtained by extracting, as a concept that can be shared between the parameters, the abstracted characteristics (including constraints as well) resulting from the selection of the parameters (the "function/setting items" and the "setting values"). Thus, if the relationship between parameters incapable of being simultaneously used (exclusive relationship) is defined in terms of the "property," it is not necessary to define the exclusive relationship between the parameters. As a result, it is possible to easily manage the relationship between parameters added and deleted by a customization operation and existing parameters. In order to extract the "property" defining such an exclusive relationship, it is necessary to extract the property the processing of which influences other processing. For example, one example includes the property (for preventing the breakage of a mechanism) that has constraints on hardware devices and cannot be physically operated. Another example includes the property that influences execution results of other processing when the processing causing the property is executed. Here, the case that influences the execution results of other processing refers to a case where execution results are not expected, a case where expected results are not obtained, or the like.

Here, FIG. 7 shows an example of a relationship table T1 of properties and parameters for defining the exclusive relationship, and FIG. 8 shows an exclusive relationship table T2 between the properties. For example, as shown in the relationship table T1 as an association unit, there are parameters such as "intensive printing" in which plural documents are reduced in size so as to be printed on one transfer paper, "double copy" in which the content of an A5 longitudinal document is printed on two A4 horizontal documents, and "mini-book" in which four documents are arranged on both sides of a transfer paper and printed so as to easily bind a book. These parameters have the property "determination of image area is required." On the other hand, "manual printing" that uses a manual-bypass tray for printing a paper of an indefinite size has the property of "indefinite transfer paper size" as shown in the relationship table T1.

According to the exclusive relationship table T2 in FIG. 8 as an exclusive relationship expressing unit, the properties "determination of image area is required" and the "indefinite transfer paper size" are the combination of the functions having the exclusive relationship due to the concept of "property." Furthermore, "double-sided printing," "mini-book," "weekly-magazine binding," or the like, in which printing is performed on both sides of a transfer paper, have the property of "double-sided image" as shown in the relationship table T1. On the other hand, as shown in the relationship table T1, an "OHP interleaf" holding an interleaf paper between OHP transfer papers has the property in which "double-sided printing is not possible with OHP transfer paper." According to the exclusive relationship table T2 in FIG. 8, the properties "double-sided image" and "double-sided printing is not possible with OHP transfer paper" are the combination of the functions having the exclusive relationship due to the concept of the "property."

Figure 9:
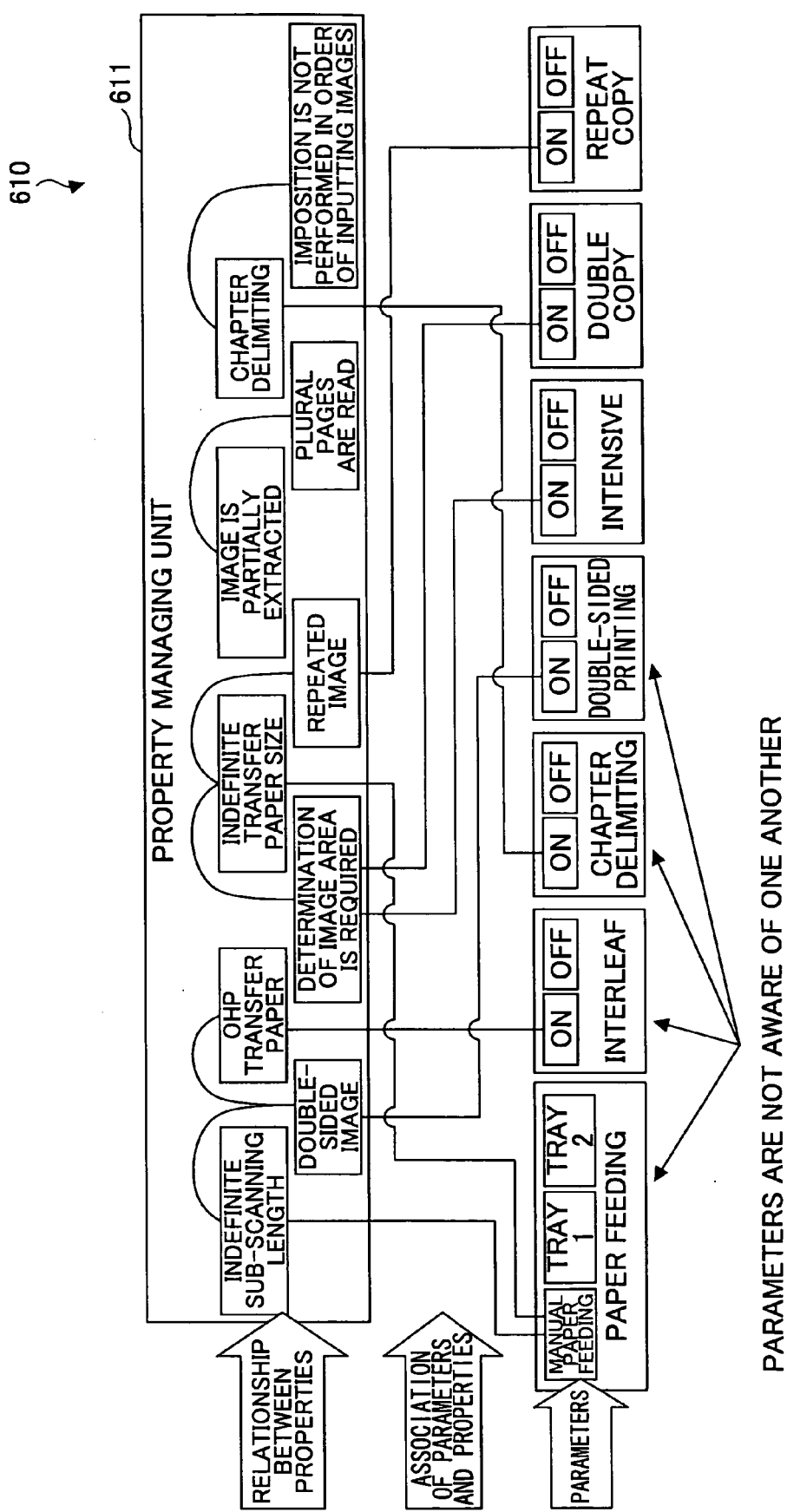
FIG. 9 shows the exclusive relationship between the properties.

Next, a description is made of expressing the exclusive relationship between the plural parameters based on the relationship between the properties as well as the association of the parameters and the properties. As shown in FIG. 9, the combination propriety determining unit 610 of the digital MFP 100 includes a property managing unit 611 (property managing means) that manages the exclusive relationship between the properties. The property managing unit 611 includes the relationship table T1 shown in FIG. 7 and the exclusive relationship table T2 shown in FIG. 8. As shown in FIG. 9, it is possible for the property managing unit 611 to manage the exclusive relationship between the parameters without being aware of the existence of other parameters, provided that the association of the parameters and the properties is shown.

Figure 10:
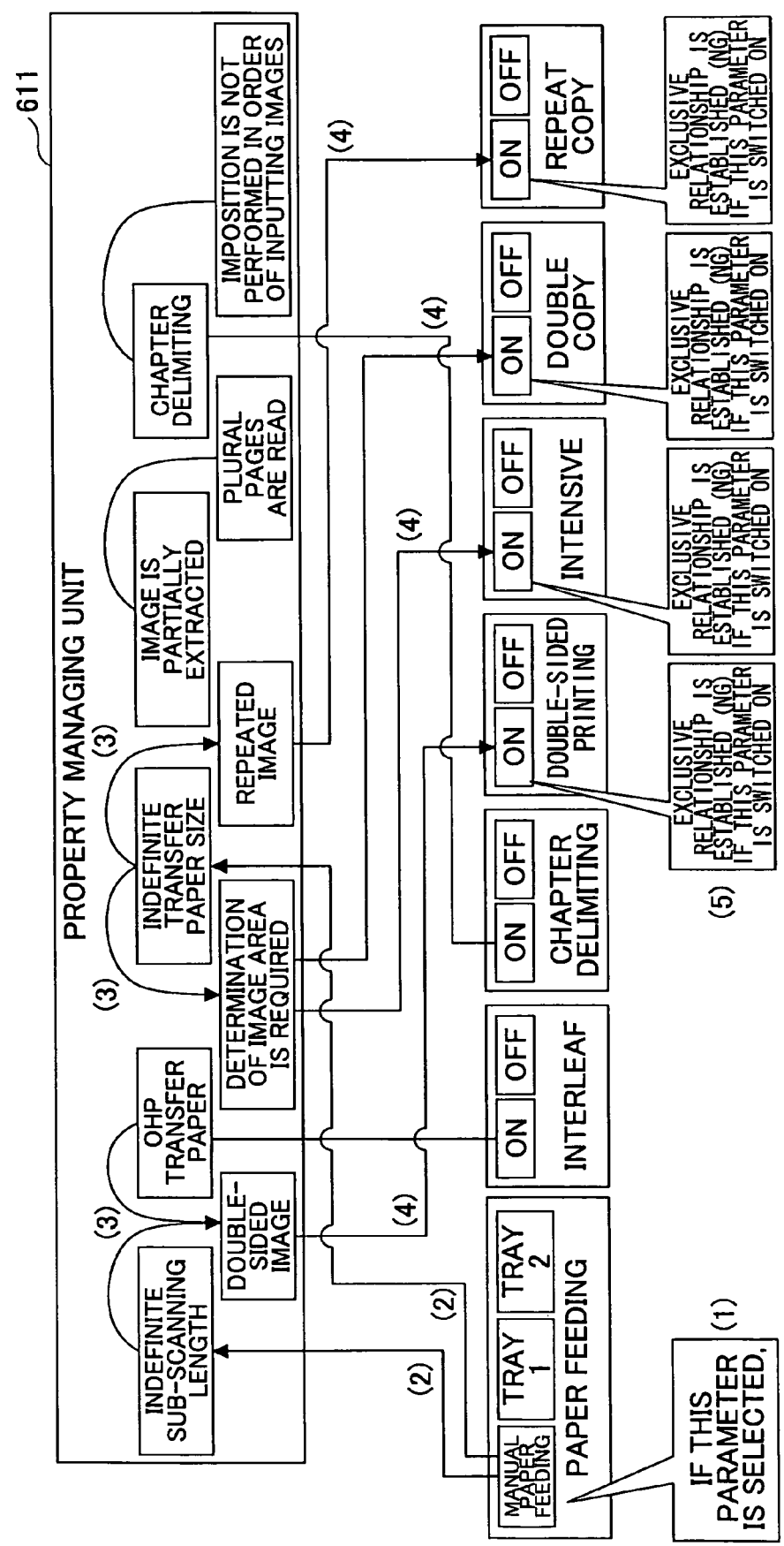
FIG. 10 shows an example of determining the exclusive relationship.

Based on the relationship in FIG. 9, an example of actually determining the exclusive relationship between the parameters is shown in FIG. 10. As shown in FIG. 10, the exclusive relationship is determined as follows.

(1) Select "manual paper feeding" (setting value) in "paper feeding" (function/setting item).

(2) "Manual paper feeding" (parameter) in "paper feeding" is associated with the properties "indefinite sub-scanning length" and "indefinite transfer paper size" (see the relationship table T1 in FIG. 7).

(3) The property of "indefinite sub-scanning length" has the exclusive relationship with the property of "double-sided image" (see the exclusive relationship table T2 in FIG. 8). The property of "indefinite transfer paper size" has the exclusive relationship with the properties "determination of image area is required" and "repeated image" (see the exclusive relationship table T2 in FIG. 8).

(4) The property of "double-sided image" is associated with "ON" (parameter) of "double-sided printing" (see the relationship table T1 in FIG. 7). The property of "determination of image area is required" is associated with "ON" (parameter) of "intensive" and "ON" (parameter) of "double copy" (see the relationship table T1 in FIG. 7). The property of "repeated image" is associated with "ON" (parameter) of "repeat copy" (see the relationship table T1 in FIG. 7).

(5) Accordingly, if the parameters of "double-sided printing," "intensive," "double copy," and "repeat copy" are switched ON when "manual paper feeding" in "paper feeding" is selected, it is determined that the exclusive relationship is established between these parameters.

Figure 11:
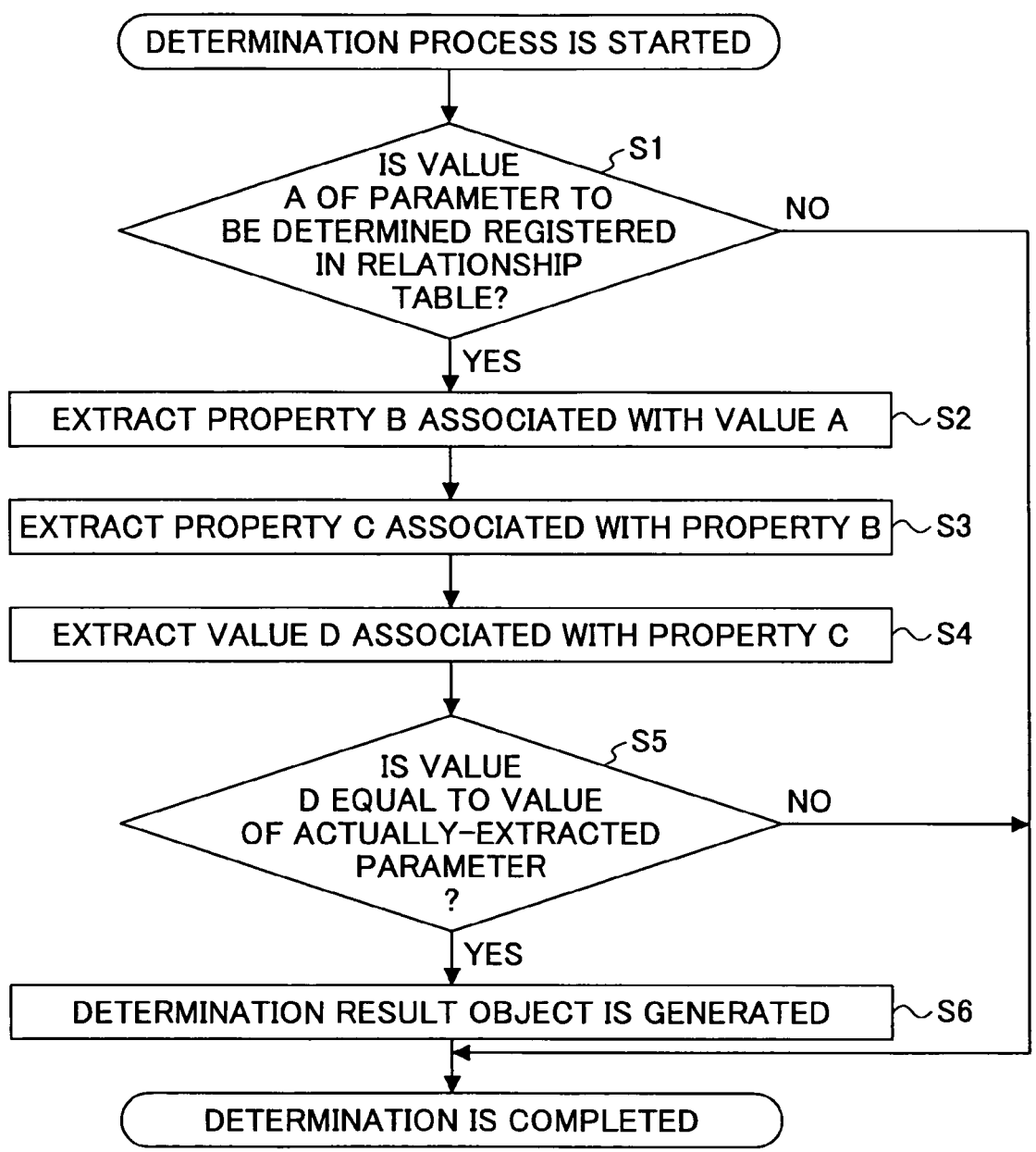
FIG. 11 is a flowchart of a combination propriety determining process.
Figure 12:
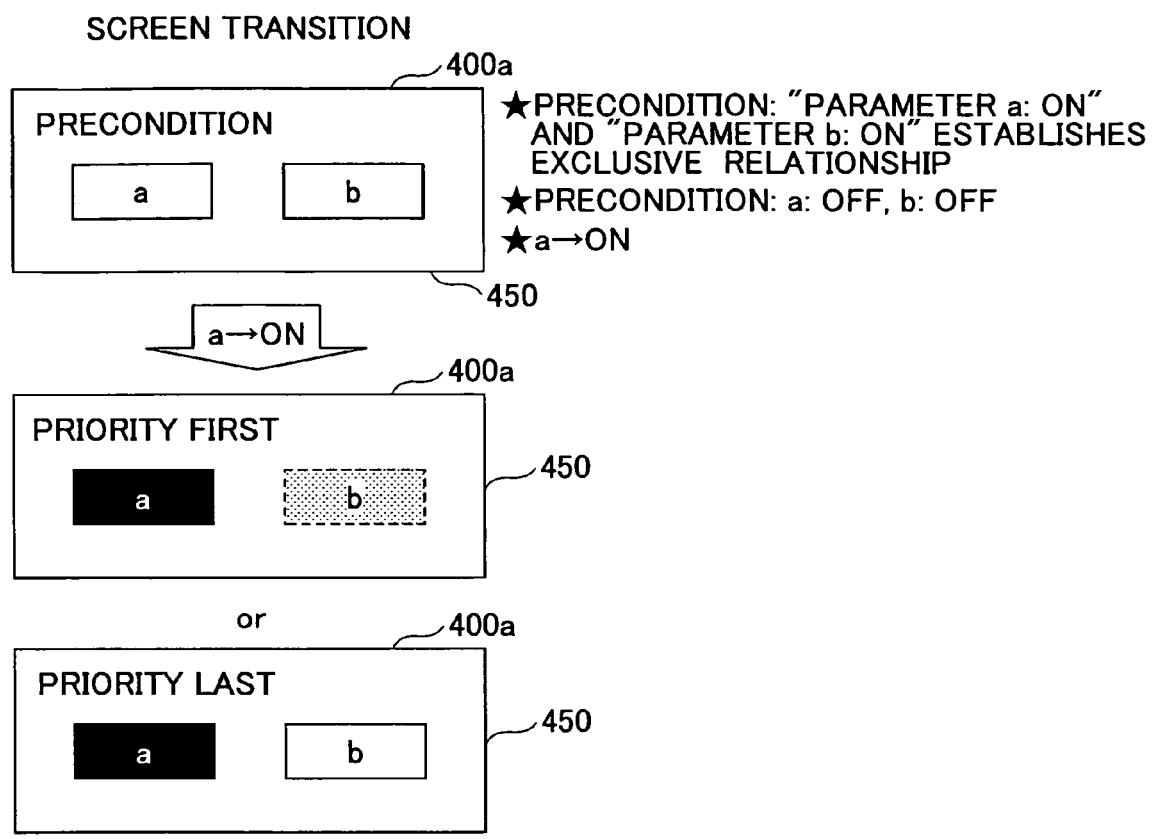
FIG. 12 shows a screen transition example.

FIG. 11 is a flowchart of a combination propriety determining process in the combination propriety determining unit 610. When the value of a parameter is selected to start the determination process ((1) in FIG. 10), the process proceeds to a determination step S1 at which it is determined whether the value A of the parameter to be determined is registered in the relationship table T1.

If it is determined that the value A of the parameter to be determined is registered in the relationship table T1 (Yes at step S1), the process proceeds to step S2 at which a property B associated with the value A of the parameter to be determined is extracted by referring to the relationship table T1 in FIG. 7 (first property extracting unit). Note that if there are plural of the properties B associated with the value A of the parameter to be determined, the plural properties B are extracted.

At the next step S3, a property C having the exclusive relationship with the property B associated with the value A of the parameter to be determined is extracted by referring to the exclusive relationship table T2 (second property extracting unit). Note that if there are plural of the properties C having the exclusive relationship with the property B, the plural properties C are extracted.

At the next step S4, the value D of a parameter associated with the property C, namely, the value D of the parameter including the property C having the exclusive relationship with the property B of the value A of the parameter to be determined is extracted by referring to the relationship table T1 in FIG. 7 (parameter extracting unit). Note that if there are plural of the values D of the parameter associated with the property C, the plural values D of the parameter are extracted.

At the next step S5, it is determined whether the value D of the parameter extracted at step S4 is equal to the value of an actually-extracted parameter.

If it is determined that the value D of the parameter extracted at step S4 is equal to the value of the actually-extracted parameter (Yes at step S5), a determination result object is generated showing that the parameter extracted at step S4 and the actually-extracted parameter have the exclusive relationship (step S6: exclusive relationship determining unit), and then the process is completed. More specifically, the determination result object is generated by the number of NG items (items determined to have the exclusive relationship), and the list of the NG items is returned to a determination request source.

On the other hand, if it is determined that the value A of the parameter to be determined is not registered in the relationship table T1 (No at step S1), or if it is determined that the value D of the parameter extracted at step S4 is not equal to the value of the actually-extracted parameter (No at step S5), no parameters having the exclusive relationship exist. Therefore, an unfilled list as a determination result is returned to the determination request source. For example, even if a tray 1 (value) or a tray 2 (value) of "paper feeding" (setting item) is selected, its property is not registered in the relationship table T1 in FIG. 7. Accordingly, no properties are extracted and no parameters having the exclusive relationship exist.

Next, a description is made of display control on the side of a UI (User Interface) that functions as a display controlling unit in the operations displaying unit 400a after the combination (exclusive relationship between parameters) is determined by the combination propriety determining unit 610 as described above. The screen transition example of a UI 450 shown in FIG. 12 refers to a case where "parameter a: ON" and "parameter b: ON" have the exclusive relationship as a precondition. Under such a condition, a discussion is made of a case where the "parameter a" is switched ON.

As a result of switching ON the "parameter a," it is reported that the "parameter b is the NG item (item determined to have the exclusive relationship) in accordance with the processes described above.

The response to the NG item is defined for each button on the UI 450. As an example of the display control, "priority first" and "priority last" are provided. In a "priority first" mode, the value of an initially-set parameter is prioritized among parameters having the exclusive relationship. In other words, as a result of setting one parameter, the value of the other parameter cannot be set. In a "priority last" mode, on the other hand, the value of a subsequently-set parameter is prioritized among the parameters having the exclusive relationship. In other words, as a result of setting the value of one parameter, the value of the other parameter is cancelled.

Accordingly, if the action of each button is specified on the side of the UI 450, the exclusive relationship on the UI 450 can be expressed only by following instructions from the property managing unit 611.

Figure 13:
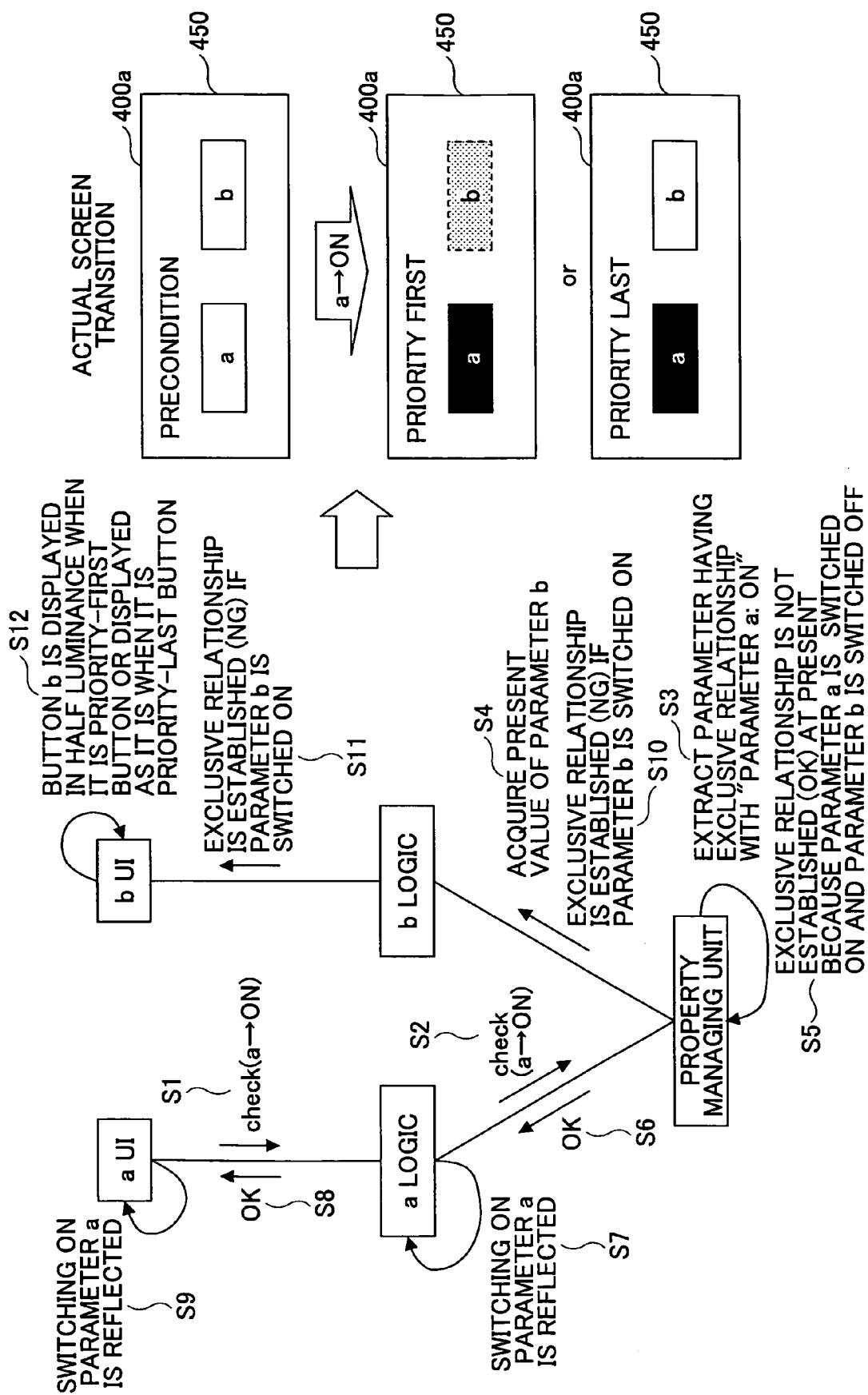
FIG. 13 shows a screen processing example where the exclusive relationship is established when a button is pressed.

Here, FIG. 13 shows a screen processing example where the exclusive relationship is established when a button is pressed. As shown in FIG. 13, when the "button a" corresponding to the "parameter a" is switched ON on the side of the UI 450 (S1), switching on the "button a" is reported to the property managing unit 611 via the logic corresponding to the "button a" (S2). The property managing unit 611 extracts a parameter having the exclusive relationship with the "parameter a" involved (S3). Here, the parameter having the exclusive relationship with the "parameter a: ON" is the "parameter b: ON." The property managing unit 611 acquires the present value of the "parameter b" from the logic corresponding to a "button b" (S4). As a result, in the case of "parameter a: ON" and "parameter b: OFF," the property managing unit 611 determines that the exclusive relationship is not established (OK) between the parameters at the present (S5). After determining that the exclusive relationship is not established (OK) between the parameters at the present, the property managing unit 611 informs the logic corresponding to the "button a" of the fact that the exclusive relationship is not established between the parameters and makes the logic be reflected (S6 and S7). At the same time, the property managing unit 611 informs the "button a" corresponding to the "parameter a" of the UI 450 of the fact that the exclusive relationship is not established between the parameters (S8). On the side of the "button a" corresponding to the "parameter a" of the UI, display is made reflecting "parameter a: ON" (S9). On the other hand, the property managing unit 611 informs the "button b" of the fact that the exclusive relationship is established (NG) if the "parameter b" is switched ON (parameter b: ON) via the logic corresponding to the "button b" of the "parameter b" (S10 and S11). The button b corresponding to the parameter b of the UI 450 is displayed in half luminance if it is a priority-first button, or displayed as it is if it is a priority-last button (S12).

Accordingly, if the action of each button is specified on the side of the UI 450, the exclusive relationship on the UI 450 can be expressed only by following instructions from the property managing unit 611.

Figure 14:
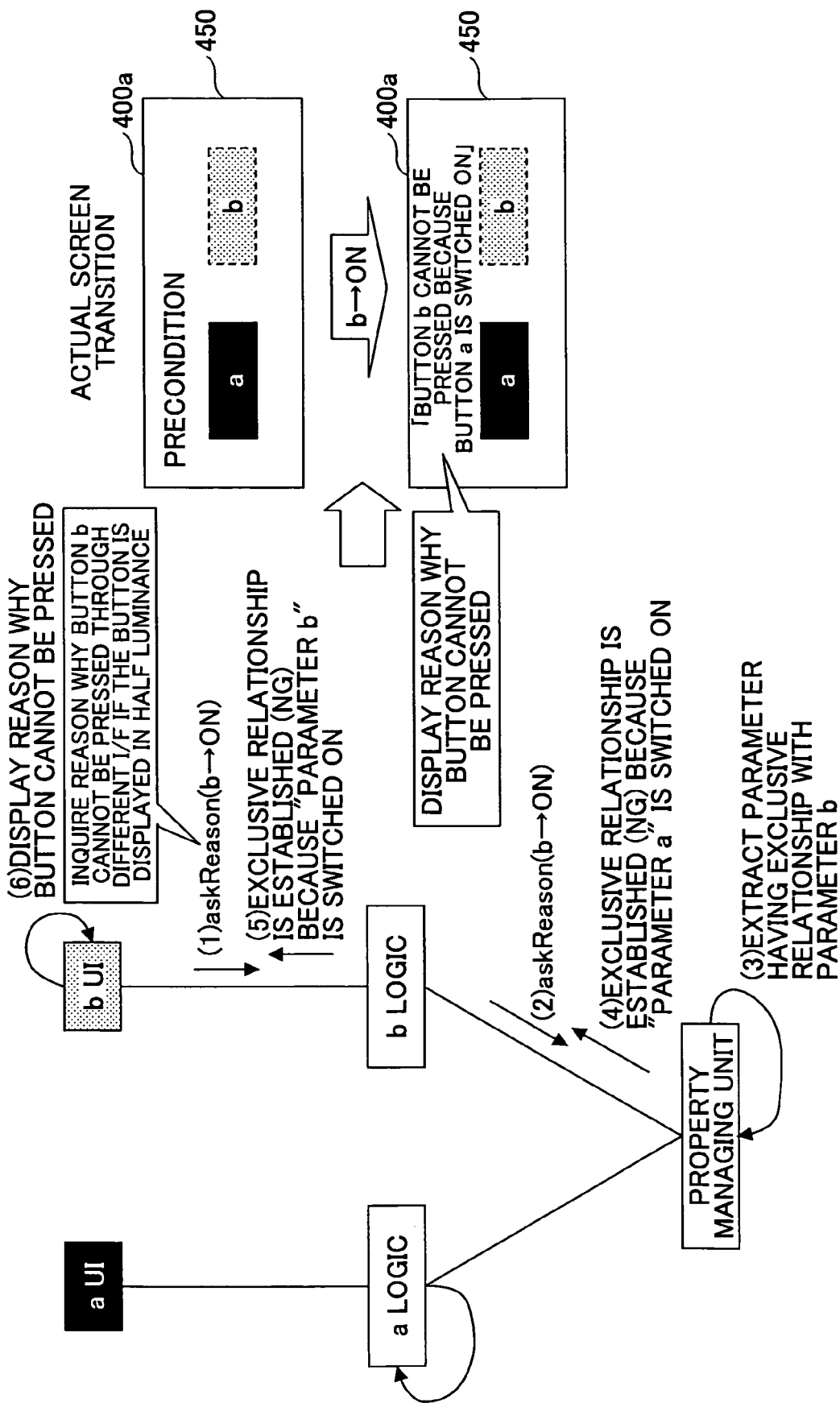
FIG. 14 shows a case where a half luminance button is pressed in a priority first mode.

FIG. 14 shows a case where a half luminance button is pressed in the priority first mode. As shown in FIG. 14, when the half luminance button is pressed in the priority first mode, the message explaining an unavailable reason (reason for NG) such as "the parameter b cannot be pressed because the parameter a is switched ON" is displayed.

Figure 15:
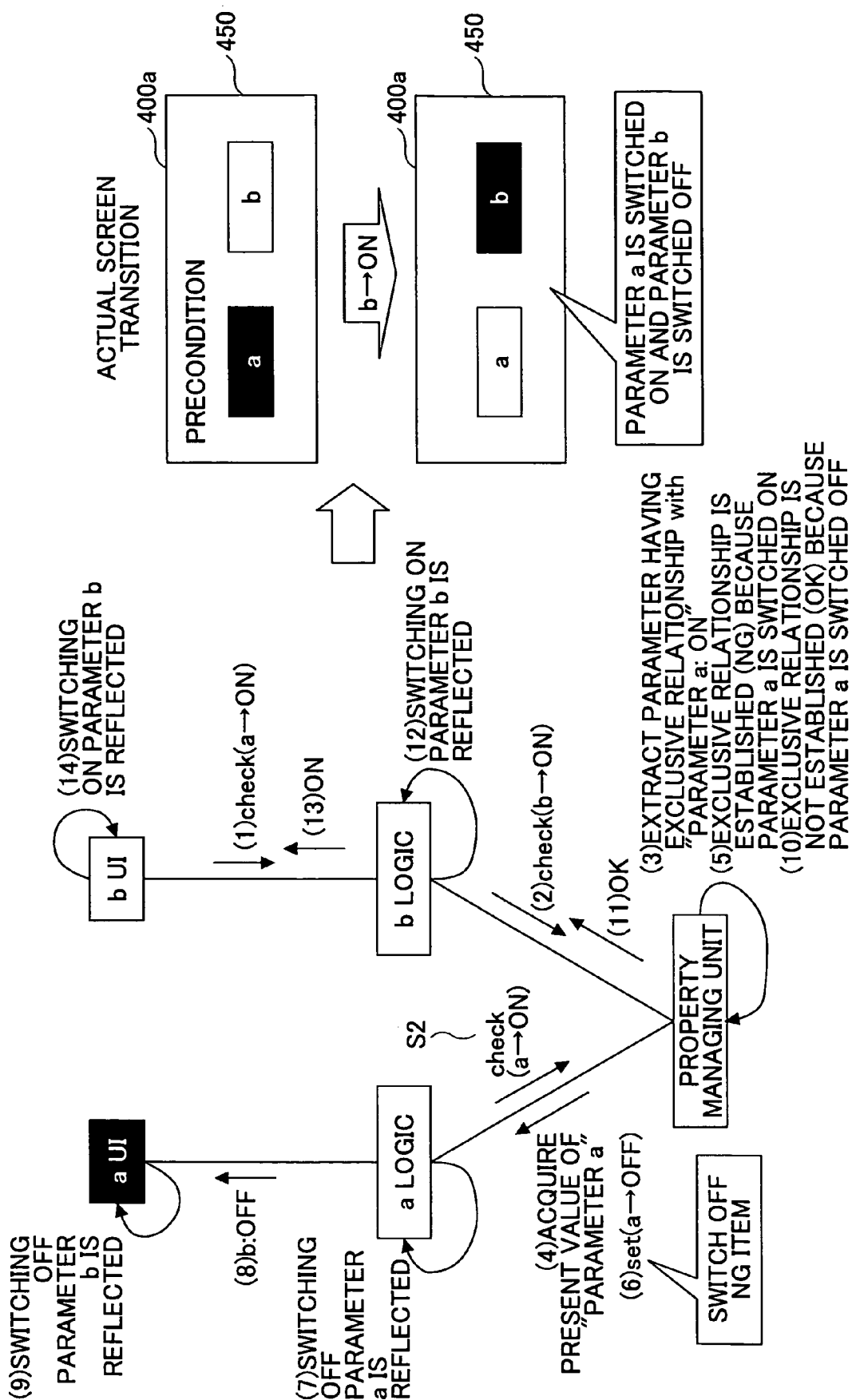
FIG. 15 shows a case where a button in an OFF state is pressed in a priority last mode.

FIG. 15 shows a case where a button in an OFF state is pressed in the priority last mode. As shown in FIG. 15, when the button in the OFF state is pressed in the priority last mode, the parameter a and the parameter b are switched OFF and ON, respectively.

Figure 16:
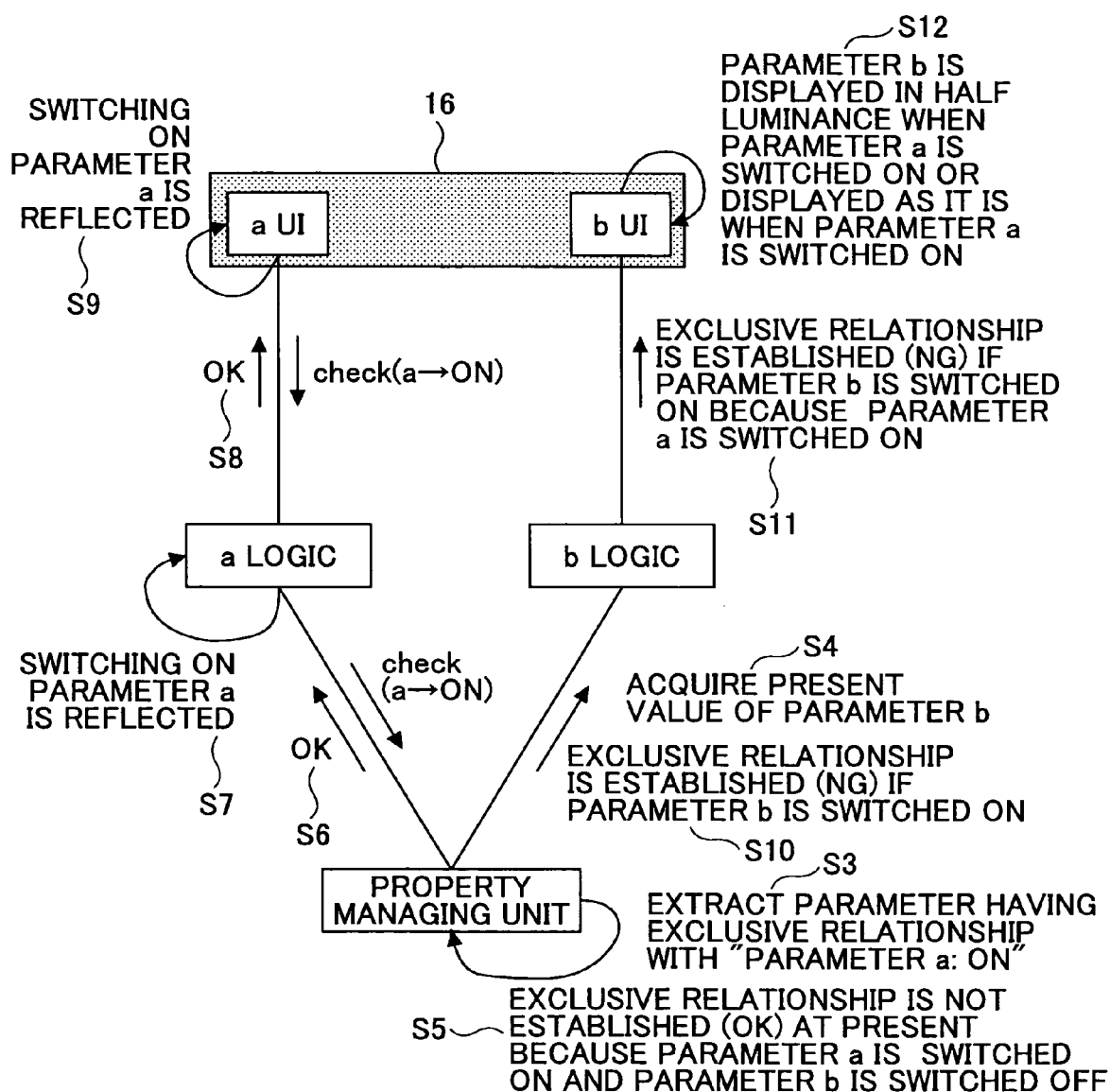
FIG. 16 is a sequence diagram showing another screen processing example where the exclusive relationship is established when a button is pressed.

Here, FIG. 16 is a sequence diagram showing another screen processing example where the exclusive relationship is established when a button is pressed. The example shown in FIG. 16 is different from that shown in FIG. 13 in that it has a UI controlling unit 16 for controlling the entire UI 450. Accordingly, the property managing unit 611 informs the button b of the fact that the exclusive relationship is established (NG) if the parameter b is switched ON (parameter b: ON) via the logic of the button b corresponding to the parameter b, because the parameter a is switched ON (parameter a: ON) (S10 and S11). The button b corresponding to the parameter b of the UI 450 is displayed either in half luminance or as it is when the parameter a is switched ON (parameter a: ON) (S12).

With the provision of the UI controlling unit 16 that controls the entire UI 450 as described above, it is possible to change a display method depending on the combination of functions, such as a case where the parameter b is displayed in half luminance if the exclusive relationship is established between the parameter a and the parameter b, or a case where the parameter b is not displayed in half luminance if the exclusive relationship is established between the parameter b and the parameter c. More specifically, the exclusive relationship is established between "double-sided printing (parameter b)" and "manual paper feeding (parameter a)" and between "double-sided printing (parameter b)" and "intensive (parameter c)." In the former case, when "manual paper feeding (parameter a)" is selected, "double-sided printing (parameter b)" cannot be selected (the button cannot be pressed). In the latter case, even when "intensive (parameter c)" is selected, "double-sided printing (parameter b)" can be selected ("intensive (parameter c)" is switched OFF).

As described above, the combination (exclusive relationship between the parameters) is determined by the combination propriety determining unit 610, and the display control is performed in accordance with the UI 450. Accordingly, it is possible to divide the responsibility of determining the combination and freely switching the display method in accordance with the UI 450. For example, if the action of each button is specified on the side of the UI 450, the exclusive relationship on the UI 450 can be expressed only by following instructions from the property managing unit 611. Furthermore, it is also possible to change the display method depending on the combination of the parameters, such as a case where the parameter b is displayed in half luminance if the exclusive relationship is established between the parameter a and the parameter b, or a case where the parameter b is not displayed in half luminance if the exclusive relationship is established between the parameter b and the parameter c.

According to the present embodiment described above, the propriety of combining the parameters is determined based on the properties as characteristics depending on the contents of processing executed in accordance with the parameters. Thus, if the relationship between the parameters incapable of being simultaneously used (exclusive relationship) is defined in terms of the "property," it is not necessary to define the exclusive relationship between the individual parameters. As a result, it is possible to easily manage the relationship between parameters added and deleted by a customization operation and existing parameters. Furthermore, the exclusive relationship between plural of the parameters is expressed based on the relationship between the properties as well as the association of the parameters and the properties. Thus, the exclusive relationship between the parameters can be expressed without being aware of the existence of other parameters, provided that the association of the parameters and the properties is shown.

Figure 17:
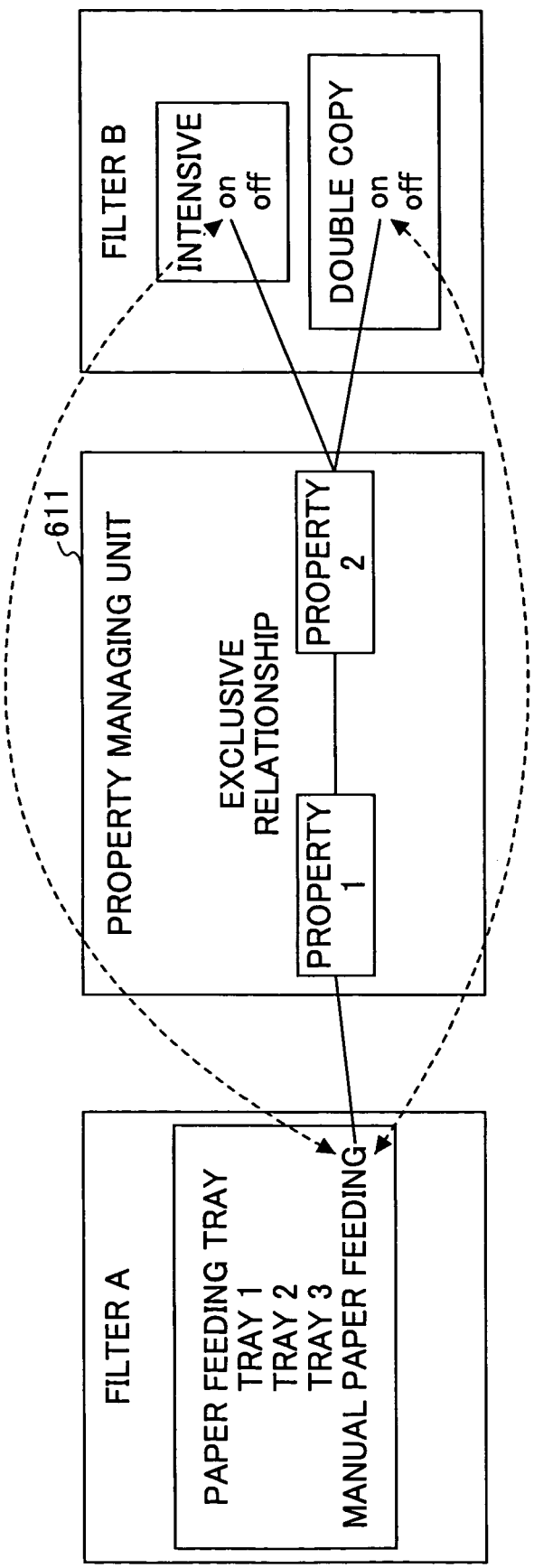
FIG. 17 shows an application example to a pipes and filters architecture.
Figure 18:
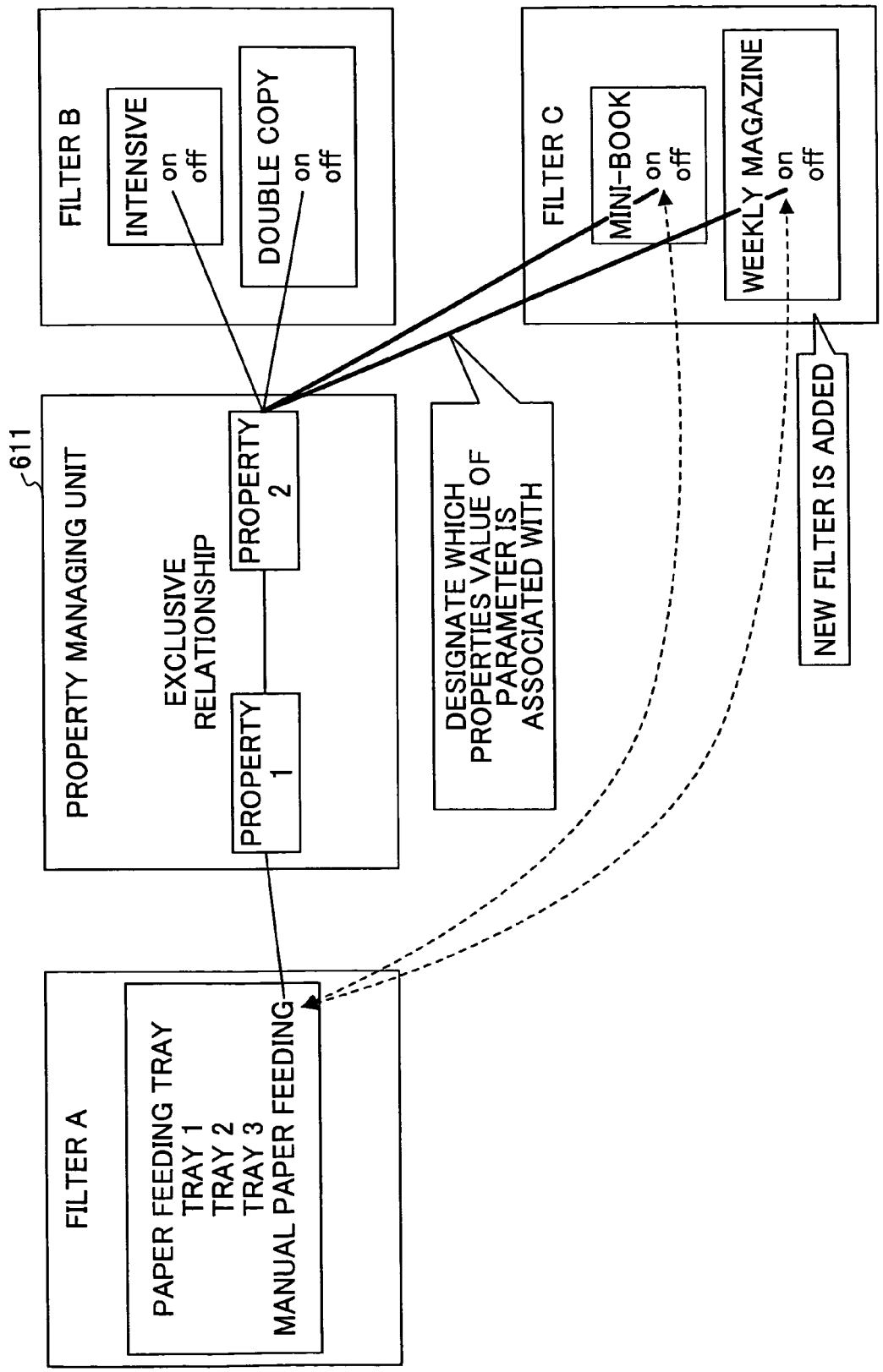
FIG. 18 shows a case where a new filter is added in the pipes and filters architecture.

Meanwhile, the processing described above can be regarded as the execution of programs based on an architecture (pipes and filters architecture) realizing application programs that perform image forming processing such as copying and faxing. Note that the application programs are realized in such a way as to cause independent modules (filters) to execute various processes such as inputting, processing, and outputting according to the functions of image forming processing, arrange memories (pipes) for placing image data between the modules (filters) to prevent the dependence between the modules (filters) at the time of providing the image data or the like, and connect the modules (filters) to each other via the memories (pipes). Concretely, as shown in FIG. 17, filters including at least one or more of the parameters are used, and the relationship between the parameters of the filters can be defined in terms of the property by the property managing unit 611. Thus, because the exclusive relationship between the parameters of the filters including at least one parameter is defined via the property managing unit 611 that manages the property based on the pipes and filters architecture, it is not necessary for the respective filters to be aware of one another. In addition, the relationship between the parameters of old and new filters can be defined in terms of the property. Therefore, even when a new filter is added as shown in FIG. 18, it is only necessary to designate which properties the setting value of the parameter of the added filter is associated with. As a result, it is not necessary to be aware of the existence of other filters when filters are added and deleted.

Figure 19:
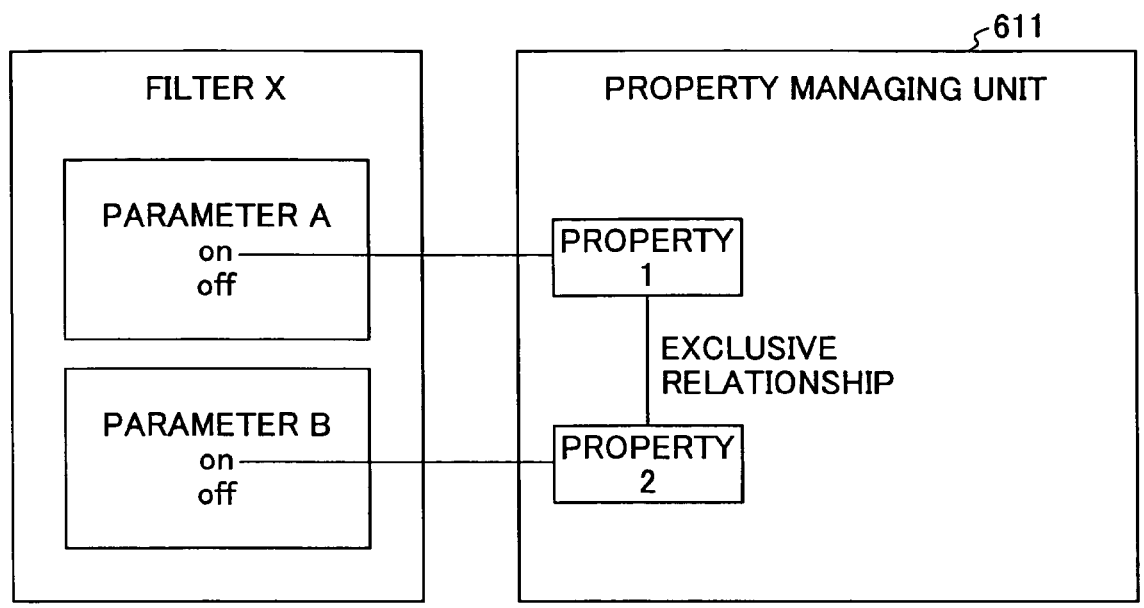
FIG. 19 shows the exclusive relationship between the parameters in the same filter in the pipes and filters architecture.

Similarly, as shown in FIG. 19, it is also possible to define the exclusive relationship between parameters in the same filter as in the case of defining the exclusive relationship between parameters in different filters. In other words, it is possible to determine the exclusive relationship between the parameters even in the same filter, provided that the association of the parameters and properties is defined. Accordingly, the exclusive relationship can be determined regardless of whether the parameters are in the same filter or in the different filters, provided that the association of the parameters and the properties is shown. Therefore, it is possible to execute consistent processing and enhance development efficiency. Thus, it is possible to realize the exclusive relationship between the parameters regardless of whether the parameters are in the same filter or in different filters if the exclusive relationship between the parameters in the same filter is defined via the property managing unit 611. As a result, it is possible to execute consistent processing and enhance development efficiency.

Figure 20:
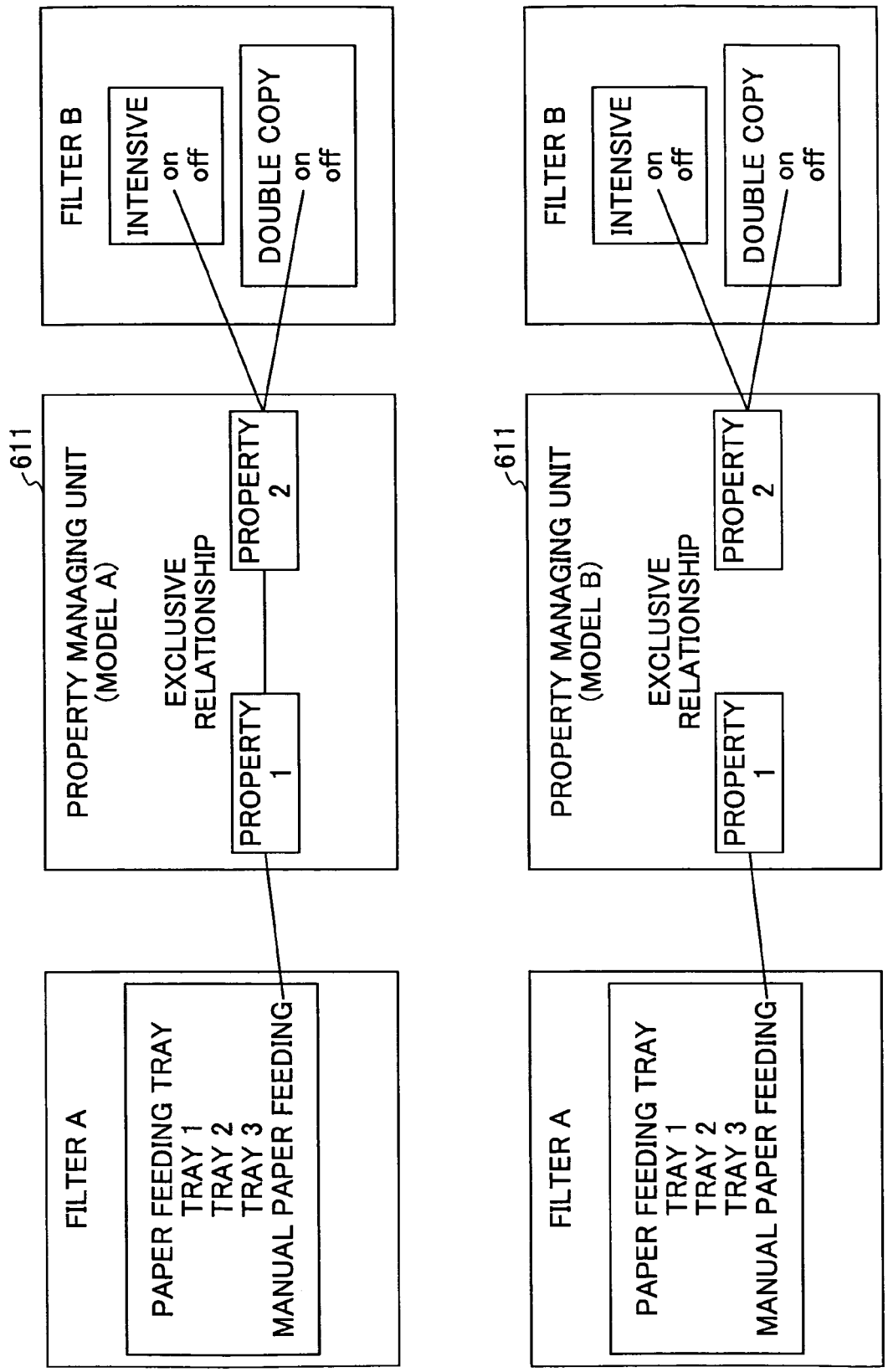
FIG. 20 shows the exclusive relationship between the parameters where there is a difference between models in the pipes and filters architecture.

Furthermore, as shown in FIG. 20, if there is a difference between models, it is possible to absorb the difference between the models by changing the exclusive relationship between the properties managed by the property managing unit 611. Accordingly, if the relationship between the properties expected to originally exist is cancelled in the other model, it is possible to express a new exclusive relationship without correcting an existing filter only by changing the relationship between the properties.

Figure 21:
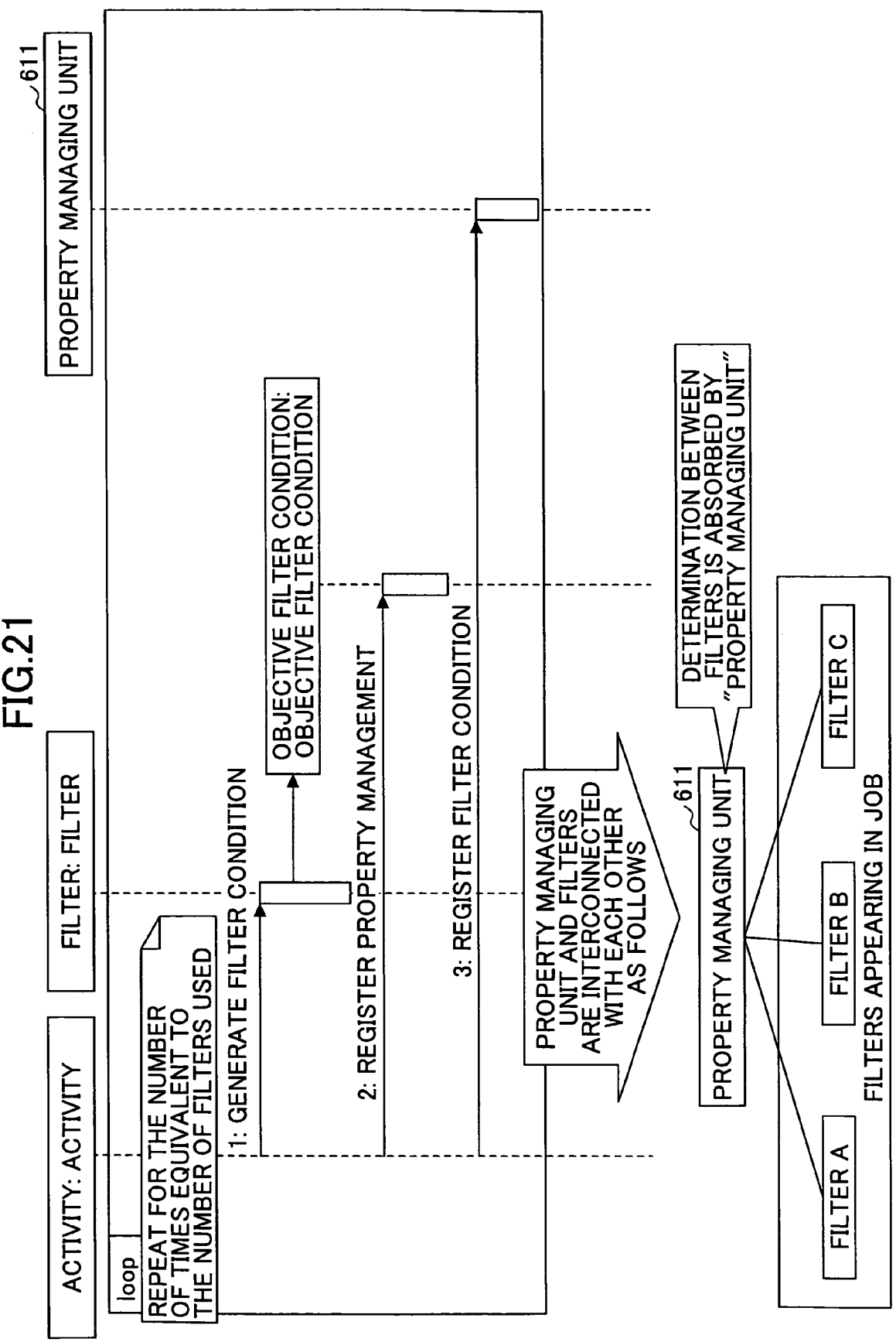
FIG. 21 is a sequence diagram showing a case where a controller interconnects a filter and a property managing unit with each other.

Note that as shown in FIG. 21 a controller (activity), which combines filters at the time of executing an application program for executing a data processing function, may interconnect the filters and the property managing unit 611 with each other. Accordingly, it is also possible here to realize a "state having no dependence between the filters" as a characteristic of the pipes and filters architecture.

Figure 22:
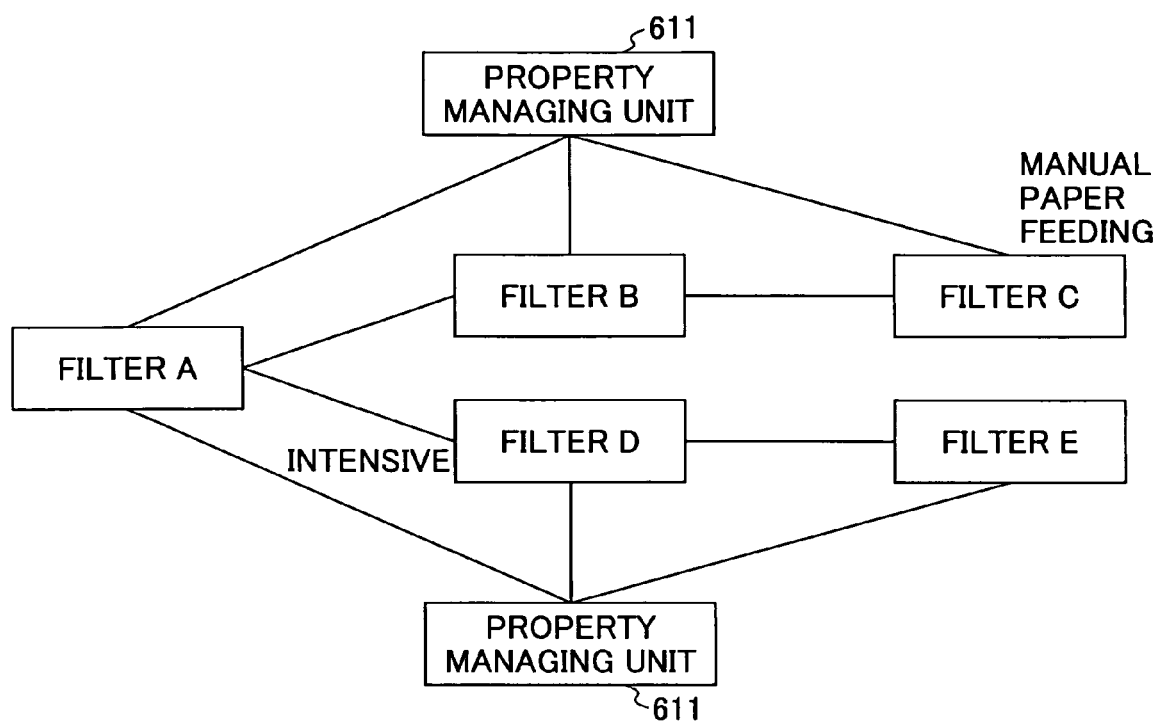
FIG. 22 shows the exclusive relationship between the parameters where there are plural paths in the pipes and filters architecture.
Figure 23:
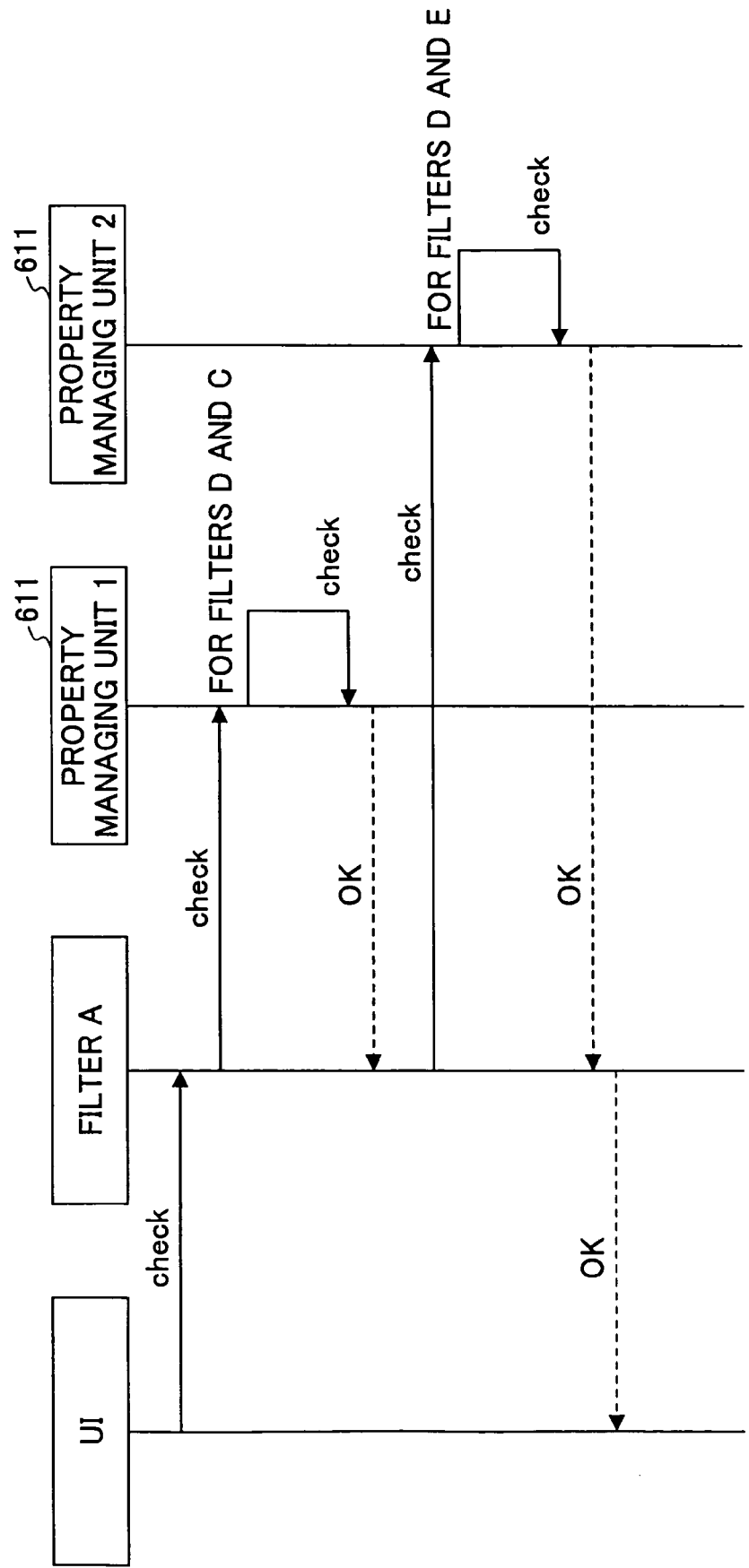
FIG. 23 is a sequence diagram showing a case where there are plural paths.

Here, a discussion is made of a multiinput-output system. As shown in FIG. 22, in the case of the multinput-output system, the controller (activity) appropriately interconnects the property managing units 611 and the filters with each other for each data inputting path and for each data outputting path. The combination propriety determining unit 610 finally determines the exclusive relationship (OK/NG) of the filter interconnected with plural of the property managing units 611 after the filter receives responses from all the property managing units 611. In FIG. 22, a filter A is equivalent to such a filter. Accordingly, even if there are plural paths, it is possible to determine a proper exclusive relationship for each path. For example, as shown in FIGS. 22 and 23, the parameters of "intensive" and "manual paper feeding" have the exclusive relationship. However, because their paths are different, it can be said that the exclusive relationship is not established between the parameters. Thus, the filters and the property managing units 611 are interconnected with each other for each path if there are plural paths. Also, the exclusive relationship of the filter interconnected with plural of the property managing units 611 is determined after the filter receives the responses from all the property managing units 611. As a result, it is possible to determine a proper exclusive relationship for each path even if there are plural paths.

Figure 24:
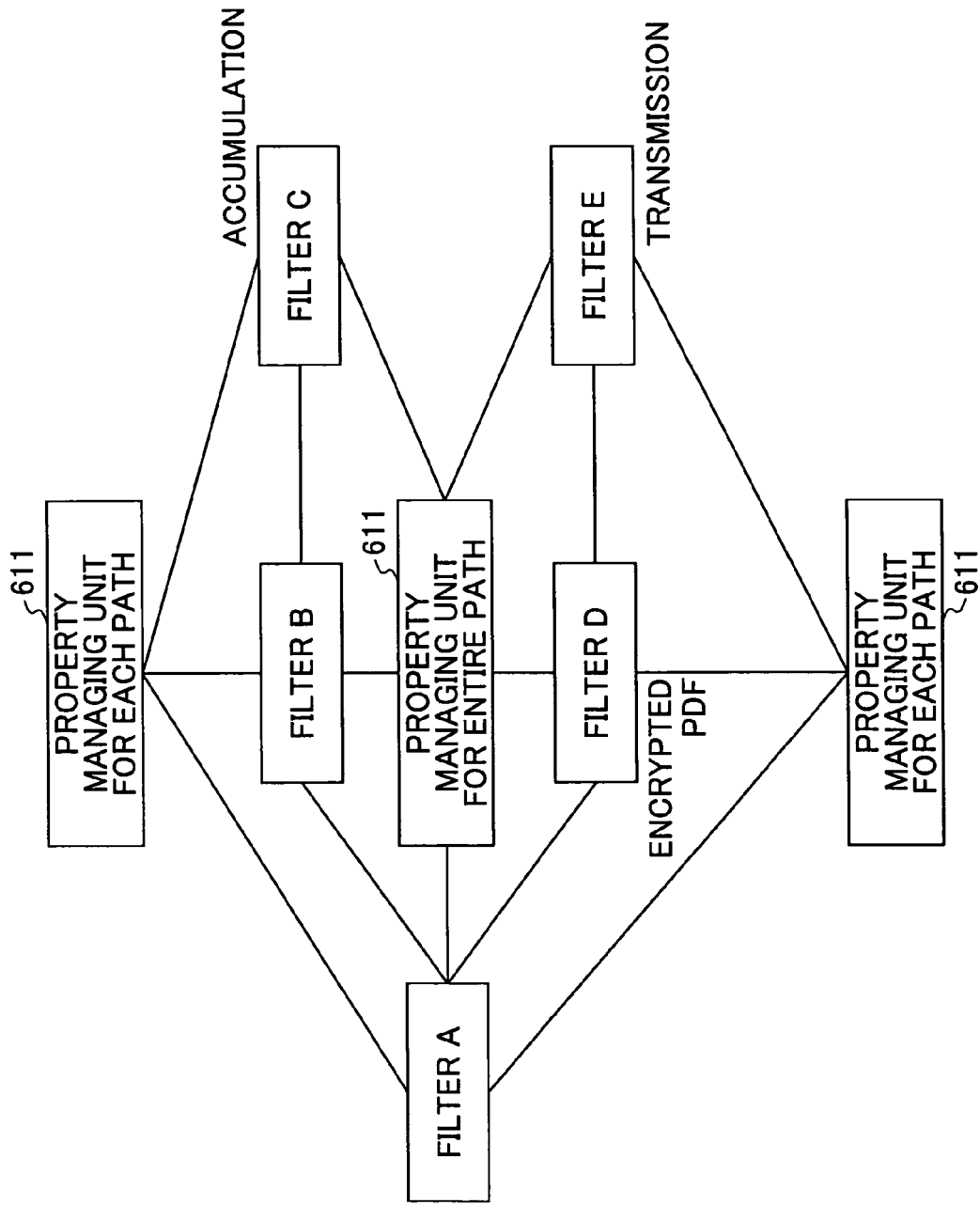
FIG. 24 shows the exclusive relationship between the parameters where there are plural paths in the pipes and filters architecture.
Figure 25:
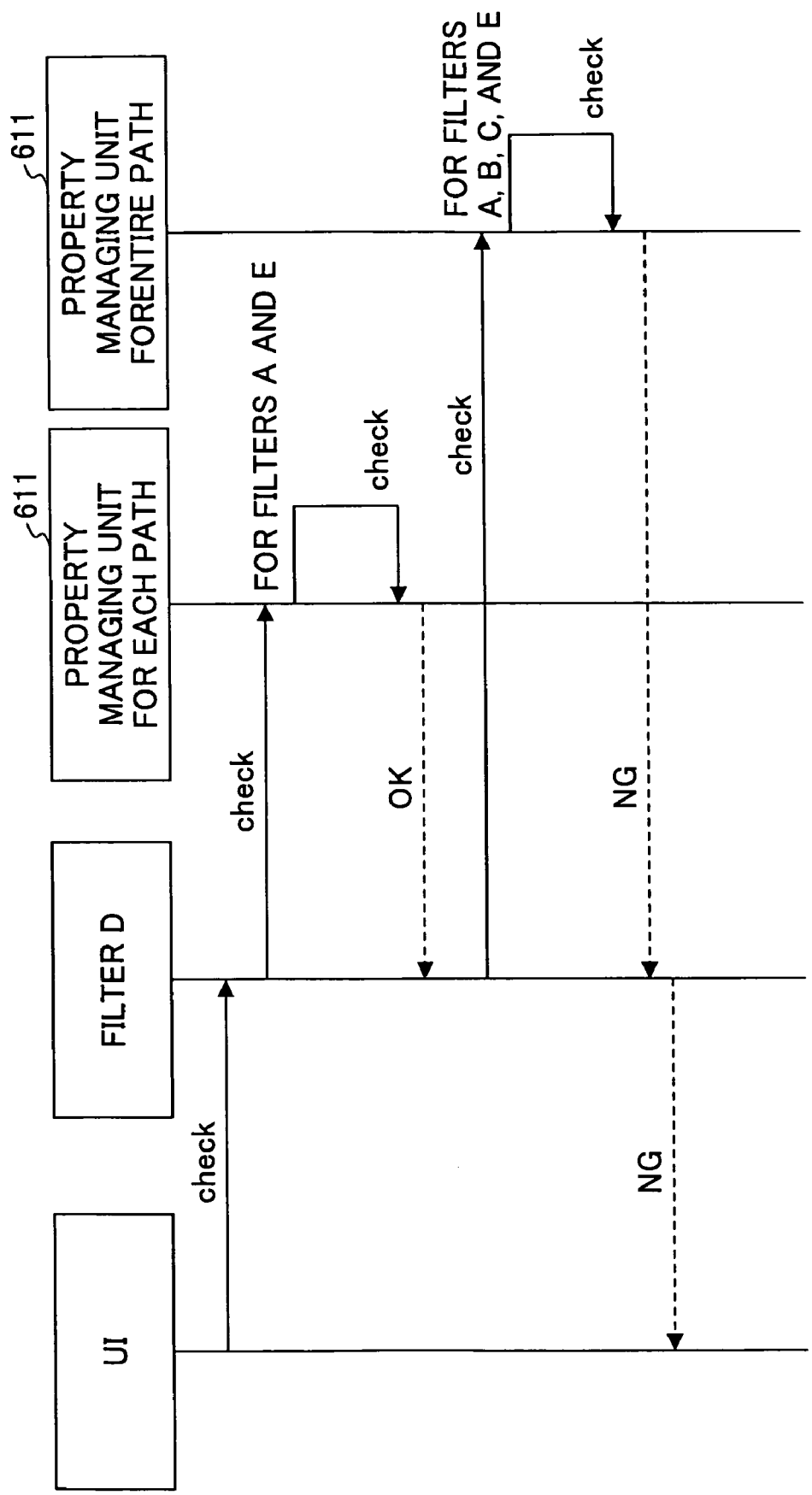
FIG. 25 is a sequence diagram showing a case where there are plural paths.

Moreover, as shown in FIG. 24, the controller (activity) may interconnect the property managing unit 611 for each path and the property managing unit 611 for the entire path with each other. The activity serves to group one or more filters into significant units. For example, assuming that the property managing unit 611 for the entire path is not interconnected with the filters in FIG. 24, a document encrypted in a lower path is caused to be accumulated in plain text in an upper path. In order to prevent such a problem, it is necessary to determine the exclusive relationship between all the filters in a job. Therefore, as shown in FIGS. 24 and 25, two types of mechanisms (exclusion rules between properties) for each path and for the entire path are prepared. Accordingly, if there is a combination of functions that must be prevented as a whole, it is possible to prevent the combination even if the path is divided into plural paths. As a result, if there are plural of the paths, the activity interconnects not only the filter and the property managing unit 611 for each path, but also all the filters with the property managing units 611. Furthermore, the combination propriety managing unit 610 determines the exclusive relationship of the filter interconnected with plural of the property managing units 611 after the filter receives responses from all the property managing units 611. As a result, if there is a combination of the functions that must be prevented as a whole, it is possible to prevent the combination even if the path is divided into the plural paths.

Next, a description is made of structuring the exclusive relationship as a featuring point of a SDK (Software Development Kit).

According to the present embodiment, a personal computer (not shown), which is used by a function developer, has a previously installed application software program capable of displaying an UI 1000 (property list displaying unit) as shown in FIG. 26 for displaying a property list where the properties associated with the parameters (function/setting items) and the setting values are selectable.

At the time of developing the filters, the function developer puts a check mark in a check box of the UI 1000 in FIG. 26 with respect to the property associated with the parameter (function/setting item) and the setting value developed. Upon receipt of the check by the function developer (reception unit), the personal computer (rule file outputting unit) outputs a rule file F as shown in FIG. 27, which is arranged in a specified path under a specified file name and indicates the exclusive relationship in accordance with the check by the function developer. The rule file F shown in FIG. 27 is described in XML. It is not necessary for the function developer to know the content (the description format of a rule) of the rule file F. Accordingly, when the function developer puts the check mark in the check box of the property associated with the parameter via the UI 1000 displayed as the property list, the rule file that is arranged in a specified path under a specified file name and indicates the exclusive relationship is output. As a result, it is possible to facilitate the structuring of the exclusive relationship due to an improvement in infrastructure. In addition, even if the format of a file is changed from the viewpoint of design, it is not necessary for the function developer to be aware of an output rule file.

Figure 28:
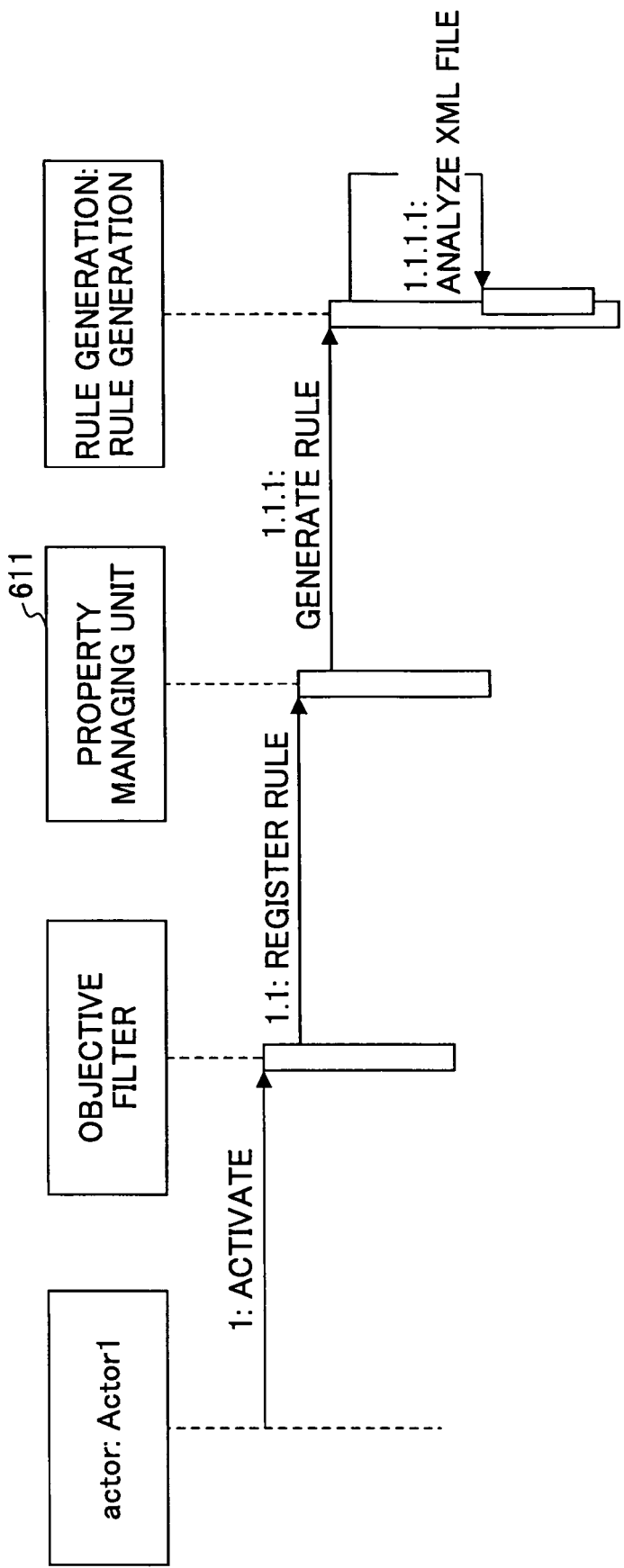
FIG. 28 is a sequence diagram showing processing executed by a FW (framework) at the time of activating an objective filter.
Figure 29:
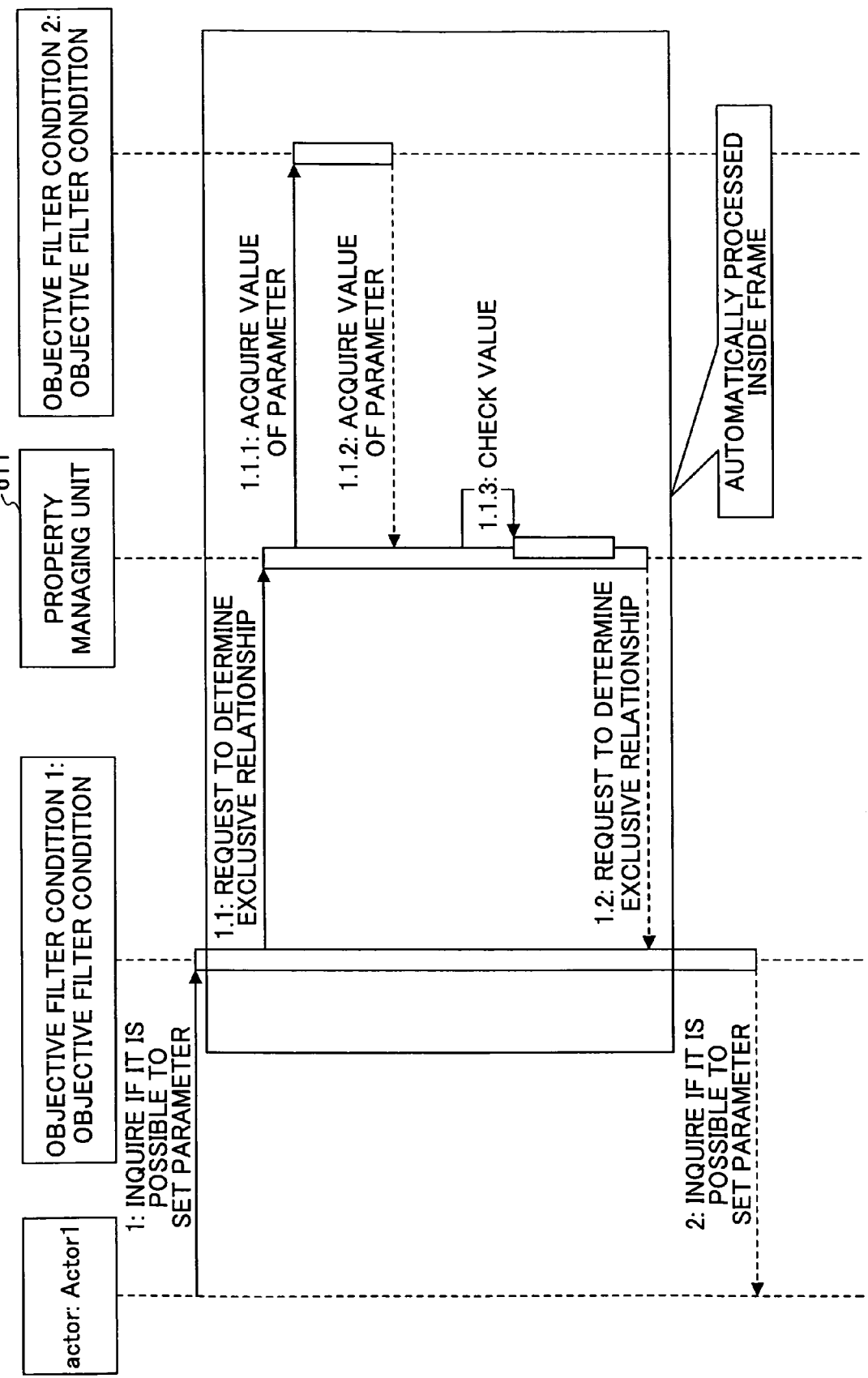
FIG. 29 is a sequence diagram showing the processing executed by the FW at the time of setting the parameters of an objective filter.

The rule file F output in the manner described above is provided to the property managing unit 611 by a FW (Frame-Work) as a framework unit prepared in the combination propriety determining unit 610. FIG. 28 is a sequence diagram showing processing executed by the FW at the time of activating an objective filter. The sequence shown in FIG. 29 is generated at the time of activating an individual objective filter, but the processing is actually executed by the FW. As shown in FIG. 28, because the FW can automatically provide the ruler file F arranged in a specified path under a specified file name to the property managing unit 611 at the time of activating the objective filter, it is not necessary to implement a rule registration for each time in the objective filter.

Next, a description is made of operations at the time of setting the parameters of an objective filter. FIG. 29 is a sequence diagram showing the processing executed by the FW at the time of setting the parameters of the objective filter. The sequence shown in FIG. 29 is generated at the time of setting the parameters of the objective filter, but the processing is actually executed by the FW. As shown in the framework in FIG. 29, the FW automatically makes registration with the property managing unit 611 at the time of setting the parameters of the objective filter. Thus, because the FW automatically queries the property managing unit 611 to set the parameters of the objective filter, it is necessary to pass through the sequence for determination. As a result, it is possible to prevent forgetting about control. Furthermore, it is not necessary for the function developer to be aware of internal processing regarding the determination.

(Second Embodiment)

Figure 30:
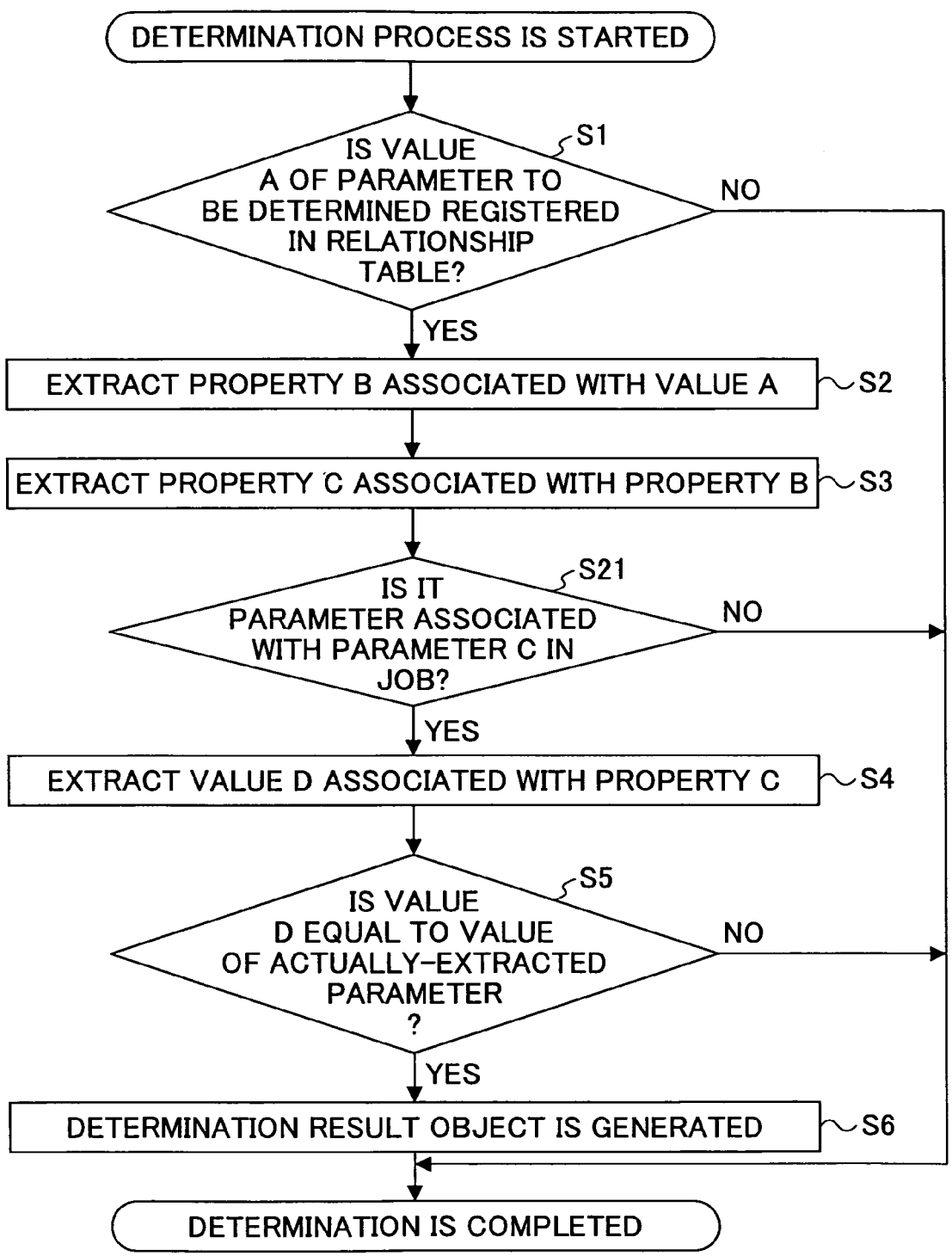
FIG. 30 is a flowchart of the combination propriety determining process according to a second embodiment of the present invention.
Figure 31:
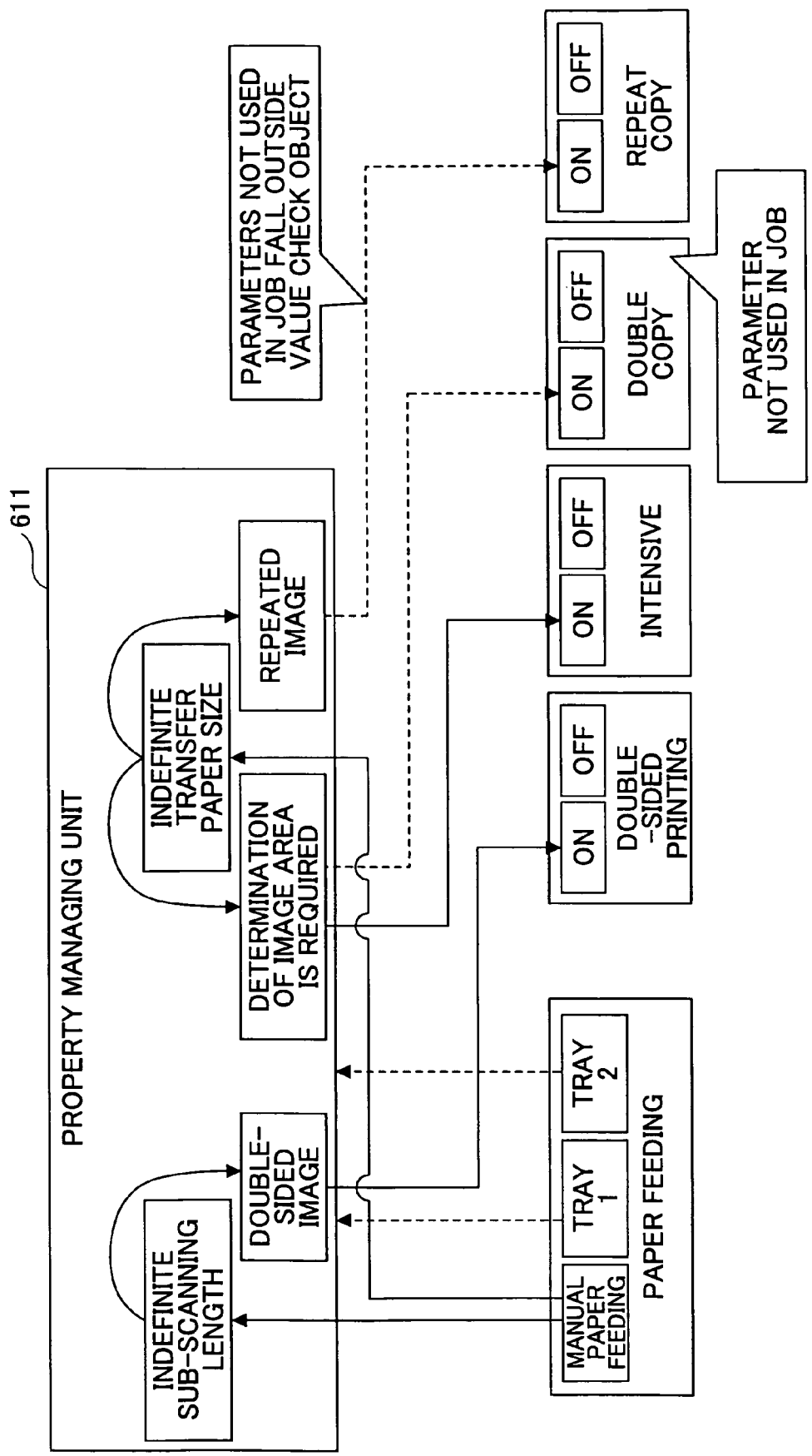
FIG. 31 shows an example of the combination propriety determining process.

Referring next to FIGS. 30 and 31, a description is made of a second embodiment of the present invention. Note that parts equivalent to those of the first embodiment are denoted by the same reference numerals and the description thereof is omitted.

The present embodiment is roughly aimed at making processing more efficient by determining whether the parameters have the association with the properties and whether the parameters are used in a job.

Here, FIG. 30 is a flowchart of a combination propriety determining process in the combination propriety determining unit 610 according to the second embodiment of the present invention, and FIG. 31 shows an example of the combination propriety determining process.

When the value of a parameter is selected to start the determination process, the process proceeds to a determination step S1 at which it is determined whether the value A of the parameter to be determined is registered in the relationship table T1.

If it is determined that the value A of the parameter to be determined is registered in the relationship table T1 (Yes at step S1), the process proceeds to step S2 at which a property B associated with the value A of the parameter to be determined is extracted by referring to the relationship table T1 in FIG. 7 (first property extracting unit). Note that if there are plural of the properties B associated with the value A of the parameter to be determined, the plural properties B are extracted.

On the other hand, if it is determined that the value A of the parameter to be determined is not registered in the relationship table T1 (No at step S1), no parameters having the exclusive relationship exist. Therefore, an unfilled list as a determination result is returned to the determination request source.

At the next step S3, a property C having the exclusive relationship with the property B associated with the value A of the parameter to be determined is extracted by referring to the exclusive relationship table T2 (second property extracting unit). Note that if there are plural of the properties C having the exclusive relationship with the property B, the plural properties C are extracted.

At the next step S21, it is determined whether the parameter is associated with the property C in a job (determination unit).

If it is determined that the parameter is not associated with the property C in the job (No at step S21), namely, if the parameter is not used in the job, it falls outside a value check object as shown in FIG. 31. Accordingly, it is possible to eliminate wasteful processing by making an irrelevant parameter fall outside a determination object. Thus, if it is determined that the parameter is not associated with the property C in the job (No at step S21), an empty list as a determination result is returned to a determination request source.

On the other hand, if it is determined that the parameter is associated with the property C in the job (Yes at step S21), the process proceeds to step S4 at which the value D of a parameter associated with the property C, namely, the value D of the parameter including the property C having the exclusive relationship with the property B of the value A of the parameter to be determined is extracted by referring to the relationship table T1 in FIG. 7 (parameter extracting unit). Note that if there are plural of the values D of the parameter associated with the property C, the plural values D of the parameter are extracted.

At the next step S5, it is determined whether the value D of the parameter extracted at step S4 is equal to the value of an actually-extracted parameter.

If it is determined that the value D of the parameter extracted at step S4 is equal to the value of the actually-extracted parameter (Yes at step S5), a determination result object is generated showing that the parameter extracted at step S4 and the actually-extracted parameter have the exclusive relationship (step S6: exclusive relationship determining unit), and then the process is completed. More specifically, the determination result object is generated by the number of NG items (items determined to have the exclusive relationship), and the list of the NG items is returned to a determination request source.

On the other hand, if it is determined that the value D of the parameter extracted at step S4 is equal to the value of the actually-extracted parameter (No at step S5), no parameters having the exclusive relationship exist. Therefore, an unfilled list as a determination result is returned to the determination request source.

According to the present embodiment, if it is determined that other parameters are not associated with the properties of one parameter, the combination propriety determining unit 610 completes the combination propriety determining process to make the irrelevant parameters fall outside the determination object. As a result, wasteful processing is eliminated to make the entire process more efficient.

According to another aspect of the present invention, there is provided a rule file outputting apparatus comprising a property list displaying unit that displays a property list where a property extracted as a concept which is associated with parameters as functions/setting items and setting values thereof and obtained by abstracting constraints and characteristics of the parameters so as to be shared between the parameters is selectable; a reception unit that receives the property associated with the desired parameter selected via the property list displayed by the property list displaying unit; and a rule file outputting unit that outputs a rule file for indicating an exclusive relationship in accordance with the property associated with the selected desired parameter received by the reception unit.

According to still another aspect of the present invention, there is provided a program that receives a parameter for setting a content of processing and causes a computer to execute the processing in accordance with the received parameter. The program causes the computer to execute a combination propriety determining function that determines, when receiving plural of the parameters, propriety of combining the received parameters based on a property as a characteristic resulting from the content of processing executed in accordance with each of the parameters.

According to the above program of the present invention, the combination propriety determining function causes the computer to execute an association function that associates the parameters with the property; an exclusive relationship expressing function that expresses the combination of the parameters having an exclusive relationship based on the property; a first property extracting function that extracts, when receiving the plural parameters, the property of one of the received parameters in accordance with the association function; a second property extracting function that extracts the property having the exclusive relationship with the property of the one parameter extracted by the first property extracting function in accordance with the combination of the exclusive relationship expressing function; a parameter extracting function that extracts the parameters including the property having the exclusive relationship with the property of the one parameter extracted by the second property extracting function; and an exclusive relationship determining function that determines, if other parameters among the received parameters exist in a group of the parameters extracted by the parameter extracting function, that the other parameters and the one parameter have the exclusive relationship.

According to yet another aspect of the present invention, there is provided a program causing a computer to execute a property list displaying function that displays a property list where a property extracted as a concept that is associated with parameters as functions/setting items and setting values thereof and obtained by abstracting constraints and characteristics of the parameters so as to be shared between the parameters is selectable; a reception function that receives the properties associated with the desired parameter selected via the property list displayed by the property list displaying function; and a rule file outputting function that outputs a rule file for indicating an exclusive relationship in accordance with the properties associated with the selected desired parameter received by the reception function.

According to the embodiment of the present invention, the propriety of combining the received parameters is determined based on a property as the characteristic resulting from the content of the processing executed in accordance with each of the parameters. Thus, if the relationship between the parameters incapable of being simultaneously used is defined in terms of the "property," it is not necessary to define an exclusive relationship between the parameters. As a result, it is possible to easily manage the relationship between parameters added and deleted by a customization operation and existing parameters.

According to the embodiment of the present invention, the exclusive relationship between plural of the parameters is expressed based on the relationship between the properties as well as the association of the parameters and the properties. Thus, the exclusive relationship between the parameters can be expressed without being aware of the existence of other parameters, provided that the association of the parameters and the properties is shown.

According to the embodiment of the present invention, if it is determined that the other parameters are not associated with the property of one parameter, the combination propriety determining unit completes the combination propriety determining process to make the irrelevant parameters fall outside a determination object. As a result, wasteful processing is eliminated to make the entire processing more efficient.

According to the embodiment of the present invention, the combination is determined by the combination propriety determining unit, and the display control is performed in accordance with the display controlling unit. Accordingly, it is possible to divide the responsibility of determining the combination and freely switching the display method in accordance with the display controlling unit. For example, if the action of each button is specified on the side of the display controlling unit, the exclusive relationship on the display controlling unit can be expressed just by following instructions from the property managing unit. Furthermore, it is also possible to change the display method depending on the combination of the parameters, such as a case where a parameter b is displayed in half luminance if the exclusive relationship is established between a parameter a and the parameter b, or a case where the parameter b is not displayed in half luminance if the exclusive relationship is established between the parameter b and a parameter c.

According to the embodiment of the present invention, the combination propriety determining unit defines the exclusive relationship between the parameters of the modules including at least one of the parameters through the property managing unit that manages the property based on the architecture that realizes the application program for executing the data processing function by connecting the independent modules for executing the various processes according to the data processing function via the memory for storing the data. Therefore, it is not necessary for the respective modules to be aware of one another. In addition, the relationship between the parameters of old and new modules can be defined in terms of the property. As a result, it is not necessary to be aware of the existence of other modules when modules are added and deleted.

According to the embodiment of the present invention, it is possible to realize the exclusive relationship between the parameters regardless of whether the parameters are in the same module or in different modules if the exclusive relationship between the parameters in the same module is defined via the property managing unit. As a result, it is possible to execute consistent processing and enhance development efficiency.

According to the embodiment of the present invention, the exclusive relationship between the properties managed by the property managing unit is capable of being changed in accordance with the difference between the models. Thus, if the relationship between the properties expected to originally exist is cancelled in the other model, it is possible to express a new exclusive relationship without correcting an existing module just by changing the relationship between the properties.

According to the embodiment of the present invention, the information processing apparatus comprises the activity that combines the modules at the time of executing the application program for executing the data processing function, and the activity interconnects the modules to be combined with the property managing unit. Accordingly, it is possible to realize a "state having no dependence between the modules" as a characteristic of the architecture that realizes the application program for executing the data processing function by connecting the independent modules for executing the various processes according to the data processing function via the memory for storing the data.

According to the embodiment of the present invention, the activity interconnects the modules to be combined with the property managing unit either for each data inputting path or for each data outputting path, and the combination propriety determining unit determines the exclusive relationship of the module interconnected with plural of the property managing units after the module receives responses from all the property managing units. As a result, it is possible to determine a proper exclusive relationship for each path even if there are plural paths.

According to the embodiment of the present invention, the activity interconnects the modules to be combined with the property managing unit either for each data inputting path or for each data outputting path, interconnects all the modules with the corresponding property managing unit, and the combination propriety determining unit determines the exclusive relationship of the module interconnected with the plural property managing units after the module receives responses from all the property managing units. As a result, if there is a combination of functions that must be prevented as a whole, it is possible to prevent the combination even if the path is divided into plural paths.

According to the embodiment of the present invention, the information processing apparatus comprises the framework unit that provides the rule file for indicating the exclusive relationship to the property managing unit at the time of activating the module. Because the framework unit can automatically provide the ruler file arranged in a specified path under a specified file name to the property managing unit, it is not necessary to implement a rule registration for each time in the objective module.

According to the embodiment of the present invention, the framework unit makes registration in the property managing unit at the time of setting the module. Thus, because the framework unit automatically inquires the property managing unit to set the parameters of the objective module, it is necessary to pass through the sequence for determination. As a result, it is possible to prevent forgetting about control. Furthermore, it is not necessary for the function developer to be aware of internal processing regarding the determination.

According to the embodiment of the present invention, when a function developer puts a check mark in a check box of the property associated with the parameter via the displayed property list, the rule file that is arranged in a specified path under a specified file name and indicates the exclusive relationship is output. As a result, it is possible to facilitate the structuring of the exclusive relationship due to an improvement in infrastructure. In addition, even if the format of a file is changed from the viewpoint of design, it is not necessary for the function developer to be aware of an output rule file.

According to the embodiment of the present invention, the propriety of combining the received parameters is determined based on a property as a characteristic resulting from the content of processing executed in accordance with each of the parameters. Thus, if the relationship between the parameters incapable of being simultaneously used is defined in terms of the "property," it is not necessary to define an exclusive relationship between the parameters. As a result, it is possible to easily manage the relationship between parameters added and deleted by a customization operation and existing parameters.

According to the embodiment of the present invention, the exclusive relationship between plural of the parameters is expressed based on the relationship between the properties as well as the association of the parameters and the properties. Thus, the exclusive relationship between the parameters can be expressed without being aware of the existence of other parameters, provided that the association of the parameters and the properties is shown.

According to the embodiment of the present invention, when a function developer puts a check mark in a check box of the property associated with the parameter via the displayed property list, the rule file that is arranged in a specified path under a specified file name and indicates the exclusive relationship is output. As a result, it is possible to facilitate the structuring of the exclusive relationship due to an improvement in infrastructure. In addition, even if the format of a file is changed from the viewpoint of design, it is not necessary for the function developer to be aware of an output rule file.

According to the embodiment of the present invention, the propriety of combining the received parameters is determined based on a property as a characteristic resulting from the content of processing executed in accordance with each of the parameters. Thus, if the relationship between the parameters incapable of being simultaneously used is defined in terms of the "property," it is not necessary to define an exclusive relationship between the parameters. As a result, it is possible to easily manage the relationship between parameters added and deleted by a customization operation and existing parameters.

According to the embodiment of the present invention, the exclusive relationship between plural of the parameters is expressed based on the relationship between the properties as well as the association of the parameters and the properties. Thus, the exclusive relationship between the parameters can be expressed without being aware of the existence of other parameters, provided that the association of the parameters and the properties is shown.

The present invention is not limited to the specifically disclosed embodiments, and variations and modifications may be made without departing from the scope of the present invention.

The present application is based on Japanese Priority Application No. 2007-178181 filed on Jul. 6, 2007, the entire contents of which are hereby incorporated herein by reference.

What is claimed is:

1. An information processing apparatus that receives at least one parameter for setting a content of processing and executes the processing in accordance with the received parameter, the information processing apparatus comprising:
   a combination propriety determining unit that determines, upon receiving a plurality of the parameters, propriety of combining the received parameters based on a property, the property being a characteristic of an output of the information processing apparatus, the characteristic resulting from the content of processing by the information processing apparatus in accordance with each of the plurality of received parameters, the combination propriety determining unit further including,
   an association unit that associates the parameters with the property;
   an exclusive relationship expressing unit that expresses the combination of the parameters having an exclusive relationship based on the property;
   a first property extracting unit that extracts, when receiving the plural parameters, the property of one of the received parameters in accordance with the association unit;
   a second property extracting unit that extracts the property having the exclusive relationship with the property of the one parameter extracted by the first property extracting unit in accordance with the combination by the exclusive relationship expressing unit;
   a parameter extracting unit that extracts the parameters including the property having the exclusive relationship with the property of the one parameter extracted by the second property extracting unit; and
   an exclusive relationship determining unit that determines, if other parameters among the received parameters exist in a group of the parameters extracted by the parameter extracting unit, that the other parameters and the one parameter have the exclusive relationship.

2. The information processing apparatus according to claim 1, further comprising:
   a determining unit that determines whether the other parameters are associated with the property extracted by the second property extracting unit in a job in accordance with the association unit; wherein,
   when it is determined that the other parameters are not associated with the property of the one parameter extracted by the second property extracting unit, the combination propriety determining unit completes a combination propriety determining process.

3. The information processing apparatus according to claim 1, further comprising:
   a display controlling unit that acquires a determination result from the combination propriety determining unit and executes display control in accordance with the determination result.

4. The information processing apparatus according to claim 1, wherein
   the combination propriety determining unit defines an exclusive relationship between the parameters of modules including at least one or more of the parameters through a property managing unit that manages the property based on an architecture that realizes an application program for executing a data processing function by connecting the independent modules for executing various processes according to the data processing function via a memory for storing data.

5. The information processing apparatus according to claim 4, wherein
   the exclusive relationship between the parameters in a same module is defined through the property managing unit.

6. The information processing apparatus according to claim 4, wherein
   the exclusive relationship between the properties managed by the property managing unit is capable of being changed in accordance with a difference between models.

7. The information processing apparatus according to claim 4, further comprising:
   an activity that combines the modules at the time of executing the application program for executing the data processing function; wherein
   the activity interconnects the modules to be combined with the property managing unit.

8. The information processing apparatus according to claim 7, wherein
   the activity interconnects the modules to be combined with the property managing unit either for each data inputting path or for each data outputting path, and
   the combination propriety determining unit determines the exclusive relationship of the module interconnected with plural of the property managing units after the module receives responses from all the property managing units.

9. The information processing apparatus according to claim 7, wherein
   the activity interconnects the modules to be combined with the property managing unit either for each data inputting path or for each data outputting path and interconnects all the modules with the corresponding property managing unit, and
   the combination propriety determining unit determines the exclusive relationship of the module interconnected with the plural property managing units after the module receives responses from all the property managing units.

10. The information processing apparatus according to claim 1, further comprising:
a framework unit that provides a rule file for indicating the exclusive relationship to the property managing unit at the time of activating a module.

11. The information processing apparatus according to claim 10, wherein
the framework unit makes registration in the property managing unit at the time of setting the module.

12. The information processing apparatus according to claim 1, wherein
processing causing the property used for the determination by the combination propriety determining unit influences other processing.

13. The information processing apparatus according to claim 12, wherein
the property used for the determination by the combination propriety determining unit causes other processing to be physically inoperative due to a constraint on a hardware device when the processing causing the property is executed.

14. The information processing apparatus according to claim 12, wherein
the property used for the determination by the combination propriety determining unit influences an execution result of other processing when the processing causing the property is executed.

15. An information processing apparatus comprising:
means for receiving at least one parameter for setting a content of processing and executes the processing in accordance with the received parameter; and
combination propriety determining means for determining, upon receiving a plurality of the parameters, propriety of combining the received parameters based on a property, the property being a characteristic of an output of the information processing apparatus, the characteristic resulting from an execution of processing by the information processing apparatus in accordance with each of the received plural parameters, the combination propriety determining means further including,
an association means for associating the parameters with the property;
an exclusive relationship expressing means for expressing the combination of the parameters having an exclusive relationship based on the property;
a first property extracting means for extracting, when receiving the plural parameters, the property of one of the received parameters in accordance with the association means;
a second property extracting means for extracting the property having the exclusive relationship with the property of the one parameter extracted by the first property extracting means in accordance with the combination by the exclusive relationship expressing means;
a parameter extracting means for extracting the parameters including the property having the exclusive relationship with the property of the one parameter extracted by the second property extracting means; and
an exclusive relationship determining means for determining, if other parameters among the received parameters exist in a group of the parameters extracted by the parameter extracting means, that the other parameters and the one parameter have the exclusive relationship.

16. A method of determining an exclusive relationship between parameters in an information processing apparatus that receives a parameter for setting a content of processing and executes the processing in accordance with the received parameter, the method comprising:
determining, when receiving plural of the parameters, propriety of combining the received parameters based on a property, the property being a characteristic of an output of the information processing apparatus, the characteristic resulting from an execution of processing by the information processing apparatus in accordance with each of the received plural parameters, the determining further including,
associating the parameters with the property;
expressing the combination of the parameters having an exclusive relationship based on the property;
extracting, when receiving the plural parameters, a first extracted property of one of the received parameters in accordance with the associating;
extracting the property having the exclusive relationship with the first extracted property in accordance with the expressing;
extracting the parameters including the property having the exclusive relationship with the first extracted property; and
determining, if other parameters among the received parameters exist in a group of the parameters extracted by the parameter extracting, that the other parameters and the one parameter have the exclusive relationship.

* * * * *